United States Patent
Romeo et al.

(10) Patent No.: US 12,002,966 B2
(45) Date of Patent: Jun. 4, 2024

(54) BATTERY ELECTRODE CONTINUOUS CASTING DRUM, SHOE, MACHINE AND METHOD

(71) Applicant: Wirtz Manufacturing Company, Inc., Port Huron, MI (US)

(72) Inventors: Michael R. Romeo, St. Clair, MI (US); Jason P. Miller, Cottrellville, MI (US); Aleksander Mrdenovic, Fort Gratiot, MI (US); John O. Wirtz, Fort Gratiot, MI (US); John W. Wirtz, II, Fort Gratiot, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 0 days.

(21) Appl. No.: 17/675,131

(22) Filed: Feb. 18, 2022

(65) Prior Publication Data
US 2022/0209246 A1    Jun. 30, 2022

Related U.S. Application Data

(63) Continuation-in-part of application No. 17/441,053, filed as application No. PCT/US2019/054796 on Oct.
(Continued)

(51) Int. Cl.
*B22D 11/06* (2006.01)
*H01M 4/04* (2006.01)
(Continued)

(52) U.S. Cl.
CPC .......... *H01M 4/84* (2013.01); *B22D 11/0634* (2013.01); *H01M 4/0485* (2013.01);
(Continued)

(58) Field of Classification Search
CPC . B22D 11/06; B22D 11/0634; B22D 11/0637; B22D 11/064; B22D 25/04; H01M 4/0485; H01M 4/84
(Continued)

(56) References Cited

U.S. PATENT DOCUMENTS 4,349,067 A * 9/1982 Wirtz et al. ............ B22D 25/04
164/439
4,415,016 A   11/1983 McLane et al.
(Continued)

FOREIGN PATENT DOCUMENTS

KR    20170048757 A    5/2017
WO    WO2020190333 A1  9/2020

OTHER PUBLICATIONS

International Search Report and Written Opinion for International Application No. PCT/US2022/16944 dated Jun. 10, 2022 (38 pages).

*Primary Examiner* — Kevin P Kerns
(74) *Attorney, Agent, or Firm* — REISING ETHINGTON, P.C.

(57) ABSTRACT

For making battery electrodes, a composite strip of a cast ribbon of an electrically conductive metal attached to and extending along an edge of a web of electrically conductive carbon fiber material, also called a carbon felt in some examples, with a plurality of spaced apart notches cast in the ribbon and opening to an edge of the ribbon spaced from the carbon fiber material. A rotatable drum with a mold cavity and a confronting casting shoe for supplying molten metal, such as liquid lead, to the cavity may be used in a casting machine to continuous cast the composite strip.

14 Claims, 32 Drawing Sheets

Related U.S. Application Data

4, 2019, which is a continuation-in-part of application No. PCT/US2019/027144, filed on Apr. 12, 2019.

(60) Provisional application No. 63/150,705, filed on Feb. 18, 2021, provisional application No. 62/820,580, filed on Mar. 19, 2019, provisional application No. 62/656,633, filed on Apr. 12, 2018.

(51) Int. Cl.
*H01M 4/66* (2006.01)
*H01M 4/84* (2006.01)

(52) U.S. Cl.
CPC .......... *H01M 4/661* (2013.01); *H01M 4/663* (2013.01); *H01M 4/667* (2013.01)

(58) Field of Classification Search
USPC ....... 164/419, 423, 427, 429, 437, 461, 462, 164/463, 479
See application file for complete search history.

(56) References Cited

U.S. PATENT DOCUMENTS

| | | |
|---|---|---|
| 4,509,581 A | 4/1985 | McLane et al. |
| 4,544,014 A | 10/1985 | McLane et al. |
| 4,545,422 A | 10/1985 | McLane et al. |
| 5,849,431 A | 12/1998 | Kita et al. |
| 9,543,589 B2 | 1/2017 | Christie et al. |
| 2019/0207200 A1 | 7/2019 | Zhamu et al. |

\* cited by examiner

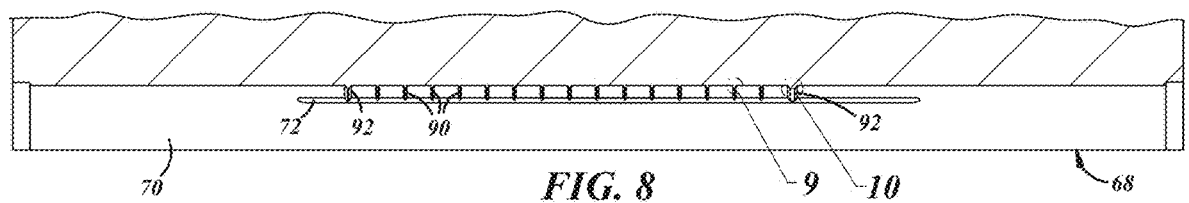
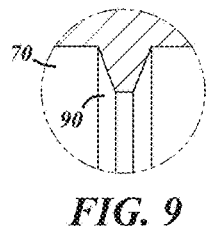
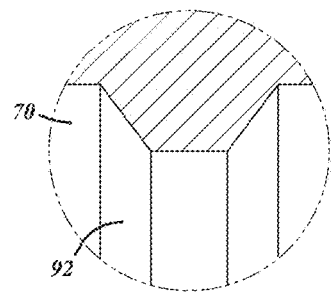
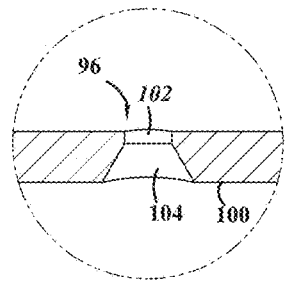
FIG. 8
FIG. 9
FIG. 10
FIG. 14

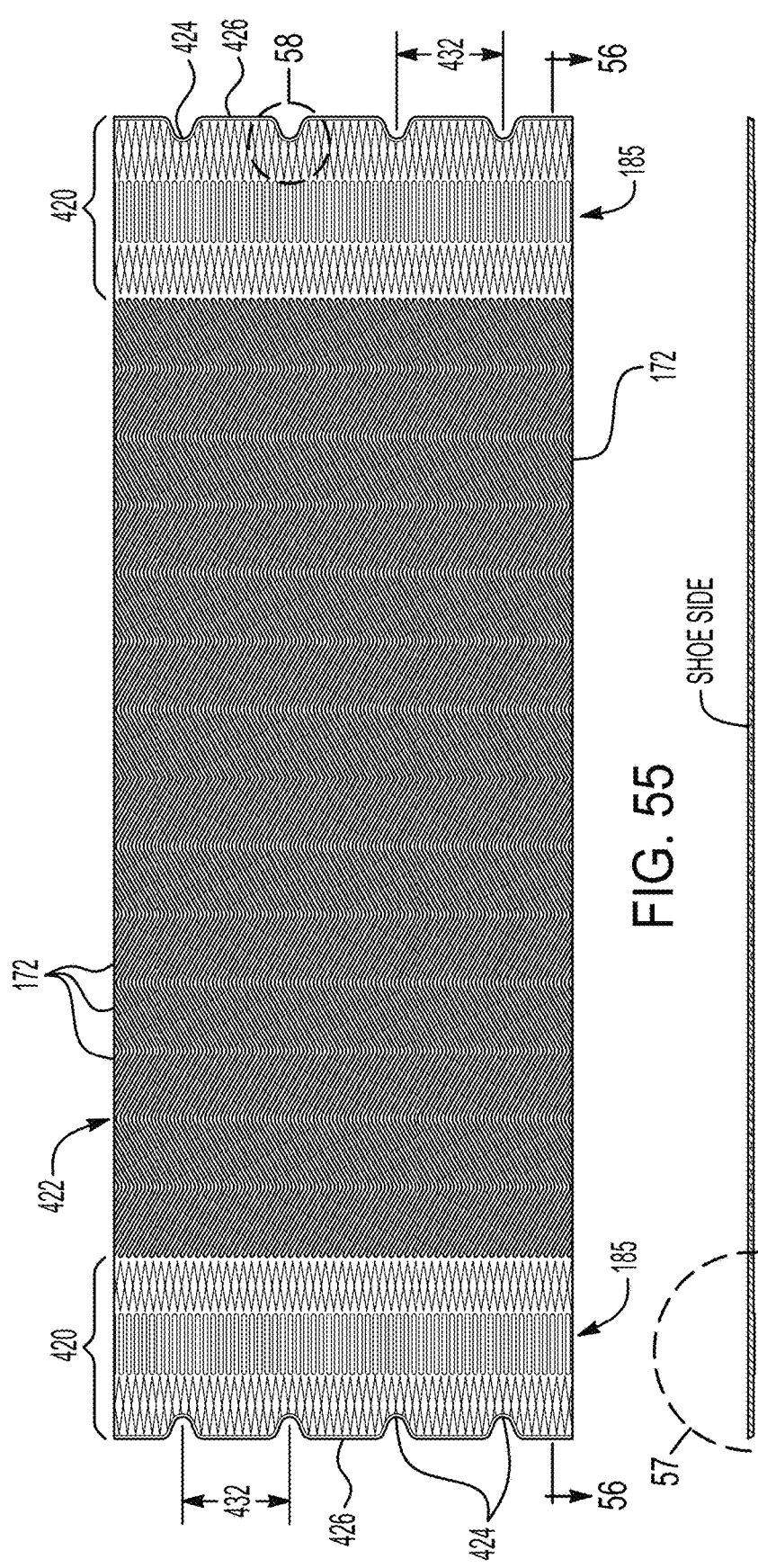
FIG. 55
FIG. 56
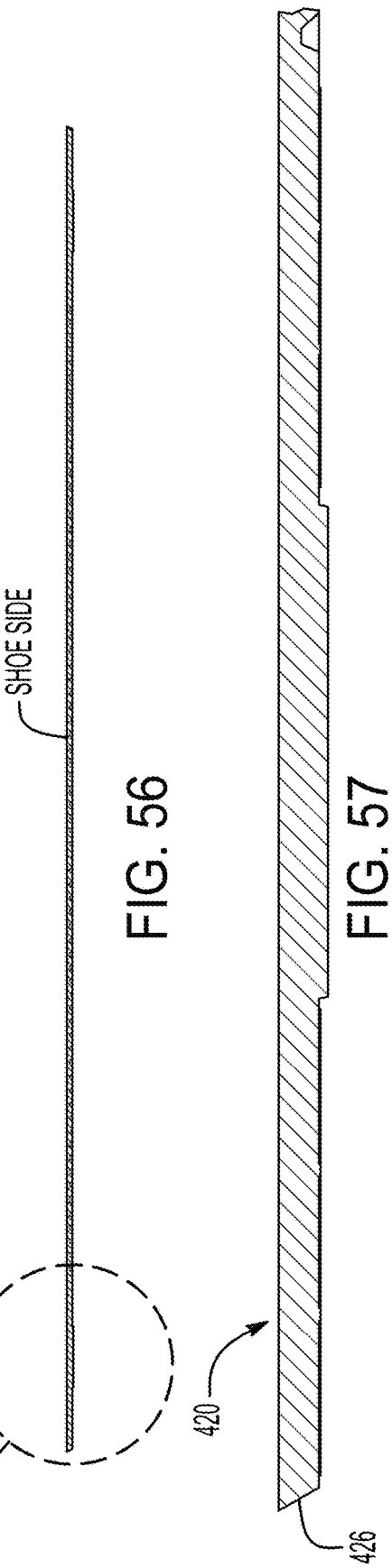
FIG. 57

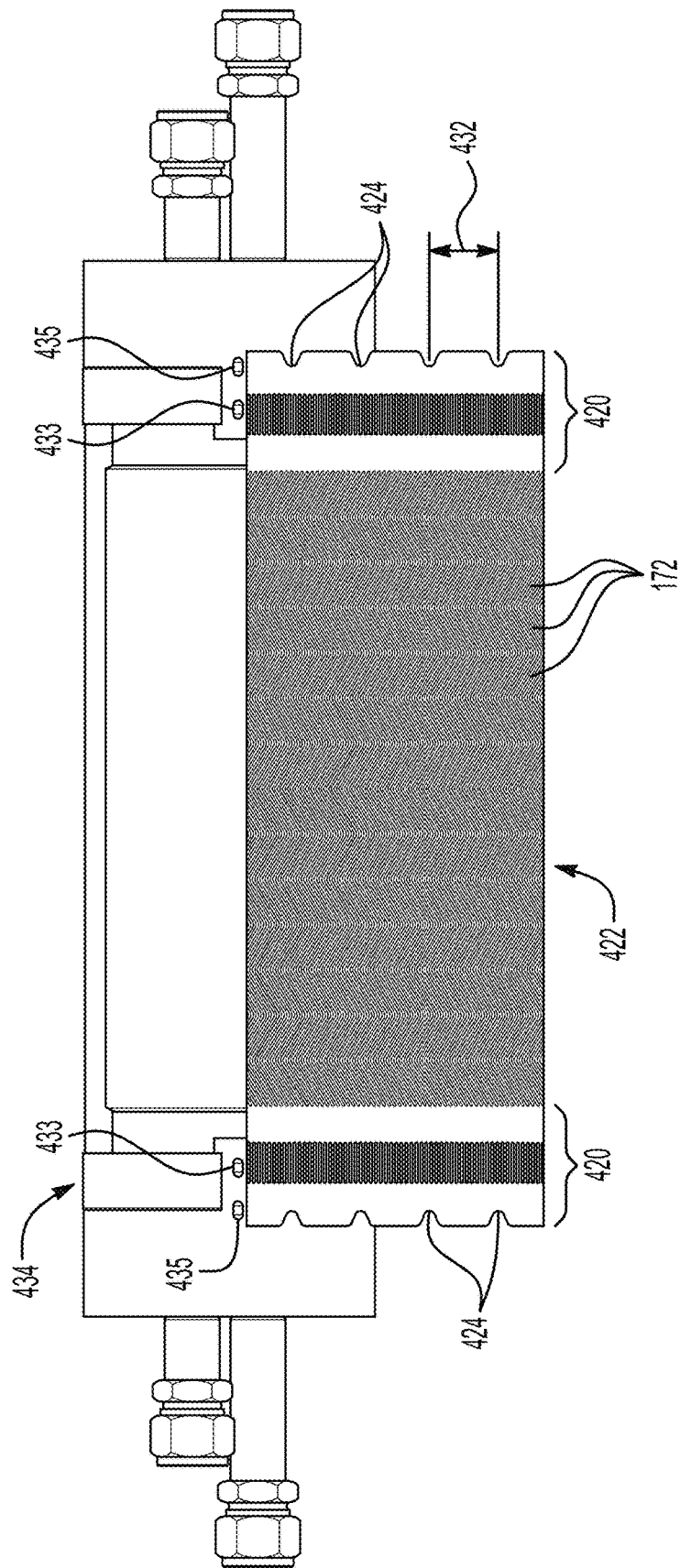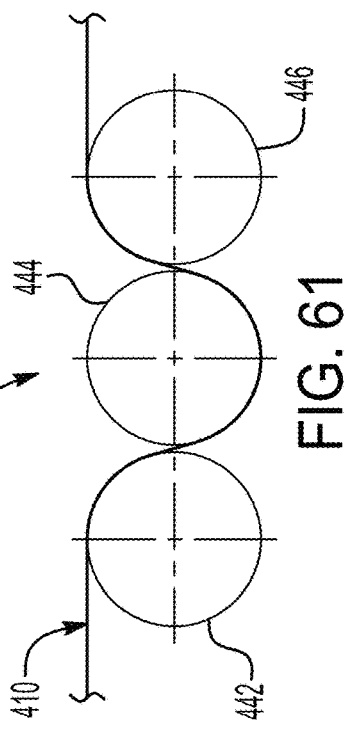

BATTERY ELECTRODE CONTINUOUS CASTING DRUM, SHOE, MACHINE AND METHOD

CROSS-REFERENCE TO RELATED APPLICATION

This application claims the benefit of U.S. Provisional Patent Application No. 63/150,705, with a filing date of Feb. 18, 2021, the contents of which are hereby incorporated by reference in their entirety. This application is a continuation-in-part of U.S. patent application Ser. No. 17/441,053, with a filing date of Sep. 20, 2021, the contents of which are hereby incorporated by reference in their entirety.

TECHNICAL FIELD

This disclosure relates generally to battery grids or electrodes and, more particularly, to a battery grid or electrode continuous casting drum, shoe, machine, and method.

BACKGROUND

Various machines for casting lead acid battery grids in a continuous manner have been developed. Some of these machines have a rotary drum usually of steel with a mold cavity of a plurality of the desired battery grid pattern formed in a cylindrical peripheral surface of the drum and a shoe of a highly thermally conductive metal such as aluminum-bronze or steel positioned in confronting and close-fitting relationship with an arcuate segment of the drum. The shoe typically has a generally axially extending orifice slot opening onto the mold cavity of the drum. Typically, excess molten lead is supplied at a super atmospheric pressure to the orifice slot to fill the portion of the mold of the drum rotating past the slot to thereby continuously cast an elongated web or strip of connected successive battery grids. The excess molten lead is directed back to a lead pot of a furnace which melts the lead supplied to the orifice and maintains it in a molten condition in the pot.

Such a continuous casting machine and shoe of lead-acid battery grids is disclosed in U.S. Pat. No. 4,415,016 assigned to the applicant of this patent application. Prior shoes for battery grid continuous casting machines of lead-acid battery grids are also disclosed in U.S. Pat. Nos. 4,544,014 and 4,545,422 assigned to the applicant of this application. This type of machine produces satisfactory lead-acid battery grids when operated under carefully controlled conditions, particularly if the temperatures of portions of the shoe and the drum are maintained within selected ranges. But certain issues have arisen when attempting to consistently produce lead grids of the highest quality at a high speed or rate of production over a long period of continuous machine operation. When operating over a prolonged period of continuous production, some of the issues have been flashing of lead between the grooves of the drum mold and thus flashing on the wires of the lead-acid battery grids, lack of complete filling of the drum mold grooves with molten lead and thus undersized grid wires and cold welded seams or junctions of the lug with adjacent wires of the cast lead-acid grid (knitted or cold weld joints) as distinguished from a homogeneously fused joint of the lug with the adjacent wire portions of the cast grid. These knitted or cold-formed joints produce lead-acid battery grids with both poor structural quality and a significantly reduced current carrying capacity of the grid.

A variety of different types of batteries have electrodes of a carbon fiber material connected to a metal electric conductor such as a lead conductor. There is a need for a way to cost effectively mass produce electrodes of a carbon fiber material attached to a lead conductor.

SUMMARY

A drum, shoe, machine, and method of continuous casting battery grids and composite electrodes with a carbon fiber material electrically connected with a continuous cast lead conductor.

In an embodiment, for a machine for continuous casting a composite strip of an electrically conductive metal attached along at least one edge of an elongate web of carbon fiber material, a mold may include a drum and at least one mold cavity. The drum can rotate about an axis of rotation. A circumferentially continuous portion of the drum is configured to receive on part thereof a portion of the web of carbon fiber material for movement with the drum. The at least one mold cavity extends circumferentially around the drum, is configured in part to underlie an adjacent edge of the portion of the web of carbon fiber material received on the drum, and extends transversely outward of the adjacent edge of the portion of the web of carbon fiber material. The at least one mold cavity is configured to cast an elongate ribbon of electrically conductive metal attached to the adjacent edge of the portion of the web of carbon fiber material received on the drum. The at least one mold cavity extends transversely outward thereof with an outer edge of the elongate ribbon of electrically conductive metal having a plurality of longitudinally spaced apart notches therethrough and opening to the outer edge of the elongate ribbon of electrically conductive metal.

In an embodiment, a process of making a composite battery electrode may include certain steps. One step may involve providing a longitudinally elongate web of an electrically conductive carbon fiber material. Another step may involve continuous casting a ribbon of an electrically conductive metal along and attached to an edge of the longitudinally elongate web of the electrically conductive carbon fiber material and with an edge spaced from the edge of the web of the electrically conductive carbon fiber material and with multiple notches opening to the edge of the ribbon of electrically conductive metal. Yet another step may involve severing the web of the electrically conductive carbon fiber material with the attached ribbon into multiple electrodes, each with a portion of the web of the electrically conductive carbon fiber material with a portion of the ribbon attached thereto with a plurality of the notches therethrough.

In an embodiment, a composite electrode for a battery may include a piece of electrically conductive carbon fiber material. The piece of electrically conductive carbon fiber material may have at least one edge and may have a ribbon of cast electrically conductive metal attached when cast to the at least one edge of the carbon fiber material. The piece of electrically conductive carbon fiber may have an edge of the ribbon spaced from the carbon fiber material with a plurality of spaced apart notches opening to the edge of the ribbon and formed when casting the ribbon.

In some embodiments of the method and apparatus, bowing or camber in an elongate composite strip of a lead ribbon on a carbon fiber material may be avoided or at least sufficiently decreased to provide commercially acceptable carbon fiber electrodes by providing a series of gaps, voids, slots or notches in an outer edge of the strip of lead ribbon as it is being cast on the fiber material. In some embodiments, the cast composite strip may be passed over straightening rollers to further reduce any residual camber in the elongate composite strip.

In some embodiments, a rotary drum with at least one mold cavity and a complementary shoe may cast a lead ribbon with a plurality of longitudinally spaced apart notches therein opening through an outer edge of the ribbon on an elongate web of carbon fiber material to produce an elongate composite strip. The elongate composite strip may be cut or severed to provide a plurality of carbon fiber electrodes for a battery.

BRIEF DESCRIPTION OF THE DRAWINGS

The following detailed description of certain embodiments and best mode will be set forth with reference to the accompanying drawings, in which:

FIG. 8 is an enlarged fragmentary sectional view taken on line 8-8 of FIG. 5;

FIG. 9 is an enlarged fragmentary view of the portion of FIG. 8 in the circle 9;

FIG. 10 is an enlarged fragmentary view of the portion of FIG. 8 in the circle 10;

FIG. 14 is an enlarged fragmentary view of the portion of FIG. 13 in the circle 14.

FIG. 55 is a layout of a side view of a portion of a circumferential cavity of a casting drum for making an elongate composite strip with a cast lead ribbon with notches in its outer edge;

FIG. 56 is a cross sectional view taken on line 56-56 of FIG. 55;

FIG. 57 is an enlarged view of the portion in circle 57 of FIG. 56;

FIG. 60 is a semi-schematic view of a face of an embodiment of a shoe confronting the drum;

FIG. 61 is a semi-schematic end view of straightening rollers;

DETAILED DESCRIPTION

Figure 1:
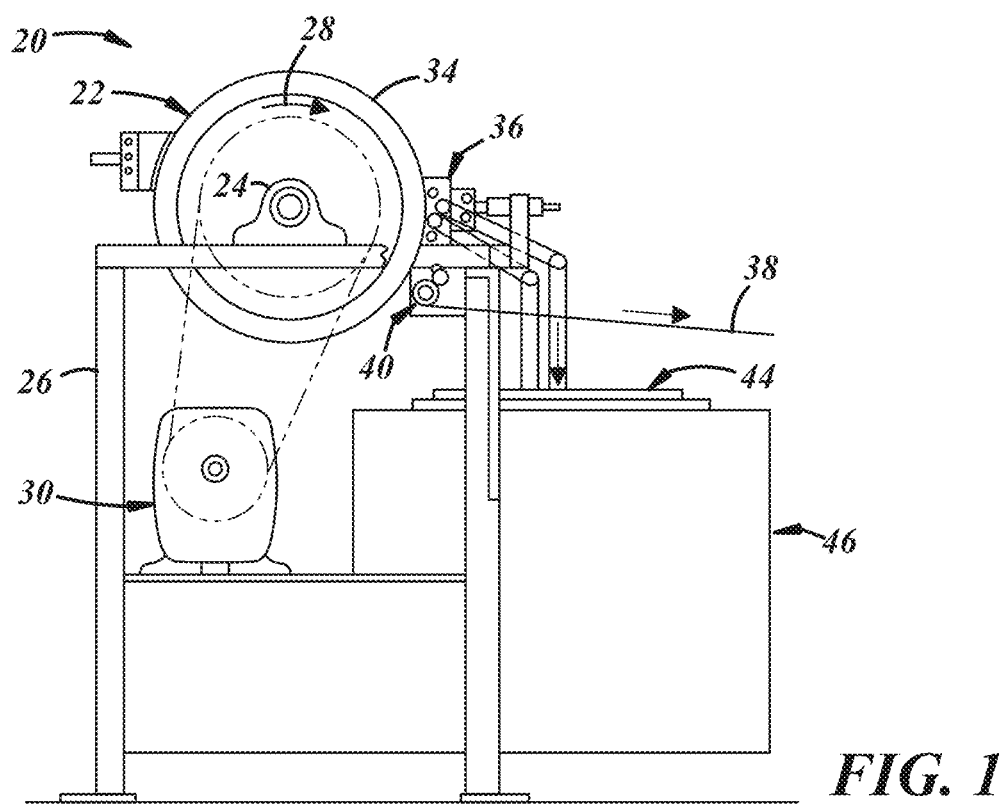
FIG. 1 is a side elevational view of an embodiment of a machine for continuous casting battery grids.
Figure 2:
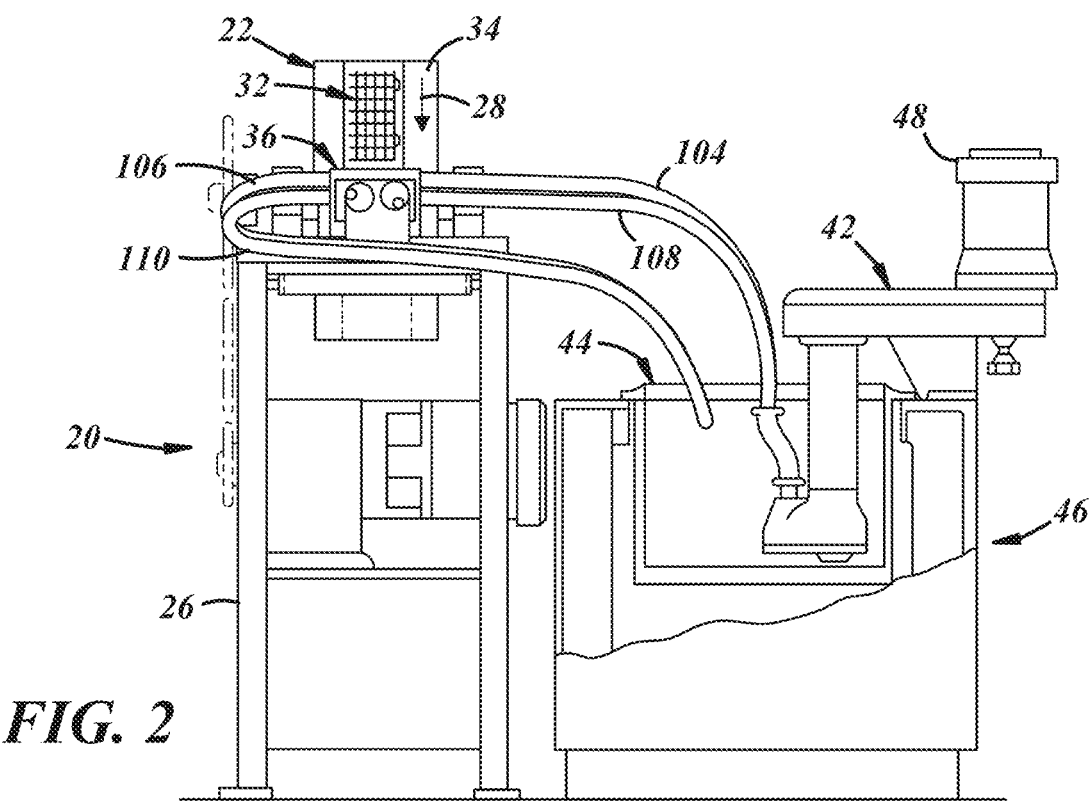
FIG. 2 is an end view of the continuous casting machine of FIG. 1.

In the drawings, FIGS. 1 and 2 illustrate a battery grid continuous casting machine 20 with a battery grid casting drum 22 journaled for rotation in a bearing assembly 24 carried by a frame 26. In use the drum 22 is driven for rotation in the direction indicated by arrow 28 in FIG. 1 by an electric motor 30 which may be a variable speed electric motor. A mold cavity 32 with a desired predetermined battery grid pattern is machined in an outer peripheral cylindrical surface 34 of the drum. Typically, the mold cavity may have a whole number of a plurality of the predetermined desired grid pattern in the cylindrical surface 34 of the drum. In use molten lead may be supplied through a shoe 36 into a confronting portion of the mold cavity 32 of the rotating drum to form a continuous strip or web 38 (FIG. 3) of connected battery grids which are removed from the drum downstream of the shoe such as by passing around a roller 40 downstream of the shoe.

Molten lead at a super atmospheric pressure may be supplied to the shoe 36 by a pump 42 from a lead melting pot 44 of a furnace 46. The pump may be driven by a variable speed electric motor 48 the speed of which may be varied and controlled to select, vary as needed and control the super atmospheric pressure and/or flow rate at which molten lead is supplied to the shoe. Excess molten lead may be returned from the shoe to the lead pot 44.

Figure 3:
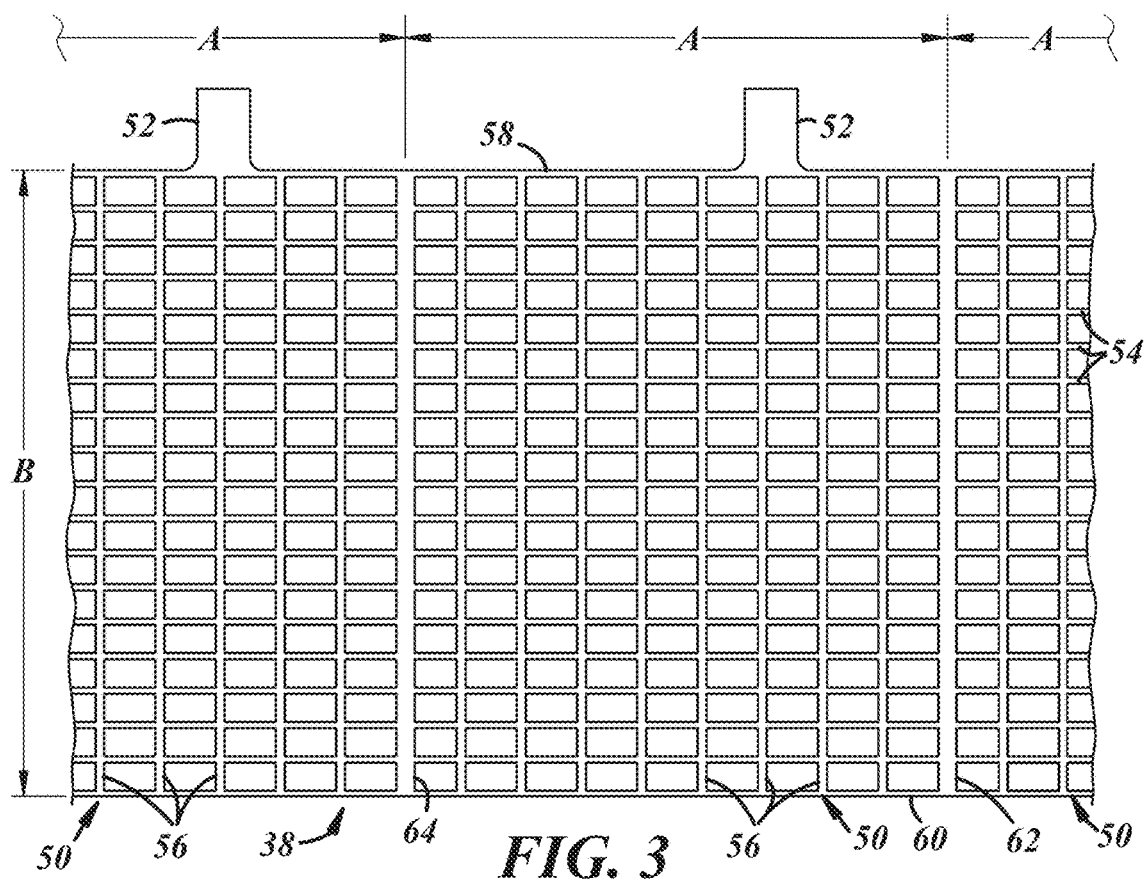
FIG. 3 is a fragmentary plan view of a strip or web of continuous cast battery grids.
Figure 4:
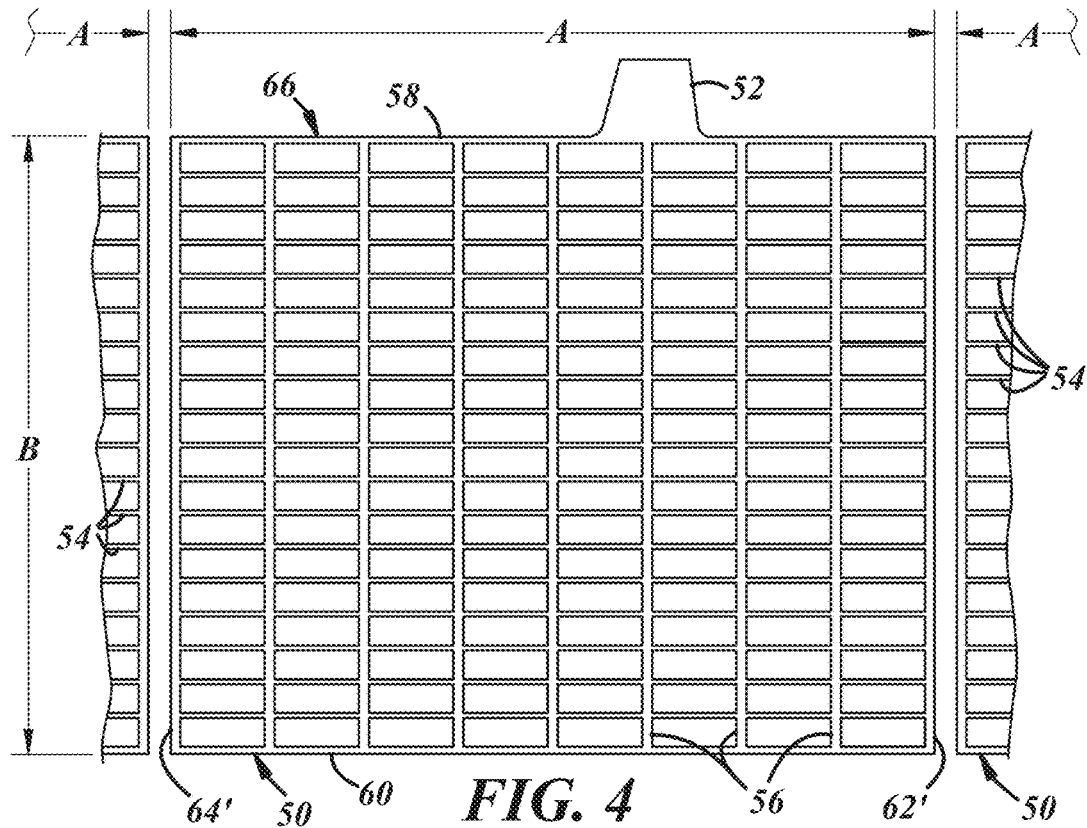
FIG. 4 is a fragmentary plan view of the separation of individual battery grids from the continuous web of FIG. 3.

As shown in FIG. 3, the cast web 38 may have a plurality of connected battery grids 50 typically of the same longitudinal web length A and web transverse width B and each with a connector lug 52. As shown in FIG. 4, the web may be separated into separate individual grids 50. The web and thus each grid 50 may have generally longitudinally extending and laterally spaced apart grid wires 54 and generally laterally or transversally extending and longitudinally spaced apart grid wires 56. The web and thus each grid 50 may include longitudinally extending wires 58 and 60 which in an individual grid may be top and bottom frame wires respectively and laterally or transversely extending wires 62 and 64 which in an individual grid may be end or side frame wires. In the web the lateral wires 62 and 64 may have a longitudinal width at least twice that of the intermediate lateral wires 56 so that when severed and separated into individual grids the end wires 62' and 64' may desirably have a width equal to or greater than the immediate lateral wires 56. The top and bottom longitudinal wires 58 and 60 may have a greater width and/or depth than the intermediate longitudinal wires 54. A peripheral frame 66 of each grid formed by the interconnected wires 58, 60, 62', and 64' may provide each grid with sufficient structural strength to be readily further processed and assembled into a battery.

As shown in FIG. 2, the mold cavity 32 in the drum may have circumferentially continuous and axially spaced apart grooves in its cylindrical peripheral surface which form the cast longitudinal wires 54, 58, and 60 of the web 38 and after severing the individual longitudinal wires of the individual grid 50. The mold cavity 32 may also have generally axially extending and circumferentially spaced apart grooves in its cylindrical surface which form the lateral wires 56, 62, and 64 of the cast web and after severing of each individual grid 50. The mold cavity 32 in the cylindrical surface of the drum will also have an appropriate recess for casting a lug 52 as part of each grid 50 of the web of continuous grids. Typically, each grid of the as cast web 38 will have essentially the same longitudinal length A and transverse width B and after separation from the web each individual grid will have substantially the same length A and width B.

Skilled persons understand and know that the intermediate lateral wires 56 may be arranged in other patterns in which they are not substantially perpendicular to the longitudinal wires 54 and the intermediate lateral wires 56 may extend at an angle with respect to the bottom and top wires 58 and 60 and may be inclined to extend toward the lug 52.

Skilled persons know how to design and construct a variety of continuous casting machines and drums with a suitable mold cavity for continuously casting a web of a wide variety of a plurality of connected grids and thus the construction of machine 20, rotary drum 22, and furnace 46 will not be further described herein. One continuous casting machine is disclosed in U.S. Pat. No. 4,509,581 which is incorporated herein in its entirety by reference.

Figure 5:
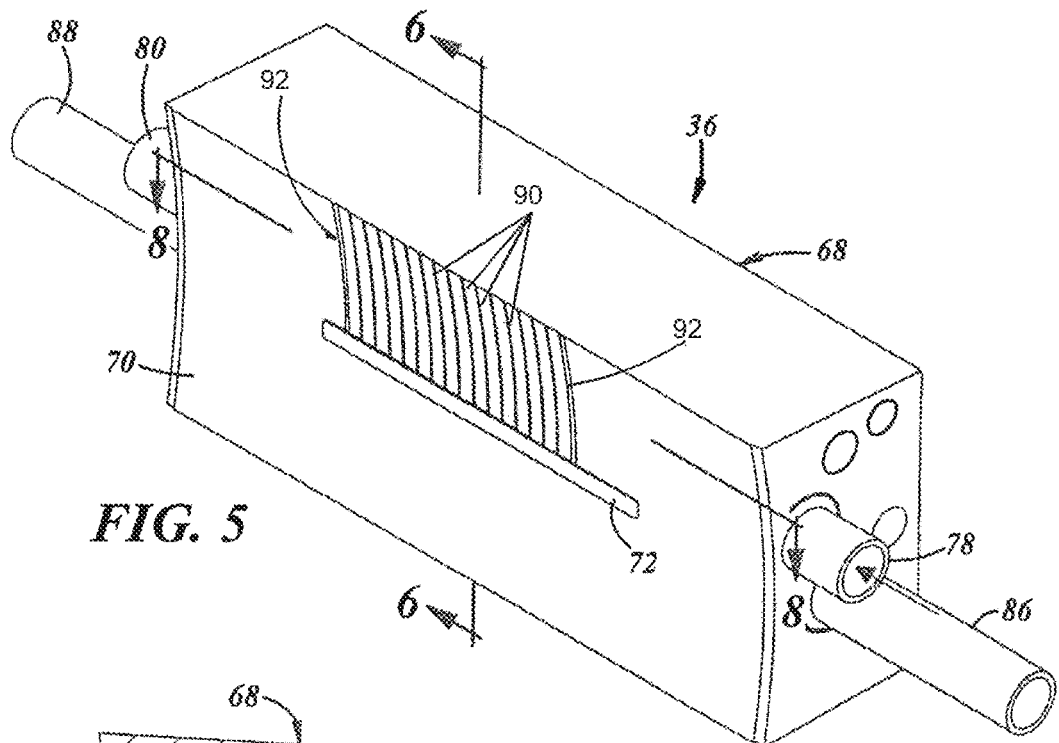
FIG. 5 is a perspective view of one form of a continuous casting shoe which may be used in the machine of FIG. 1.
Figure 6:
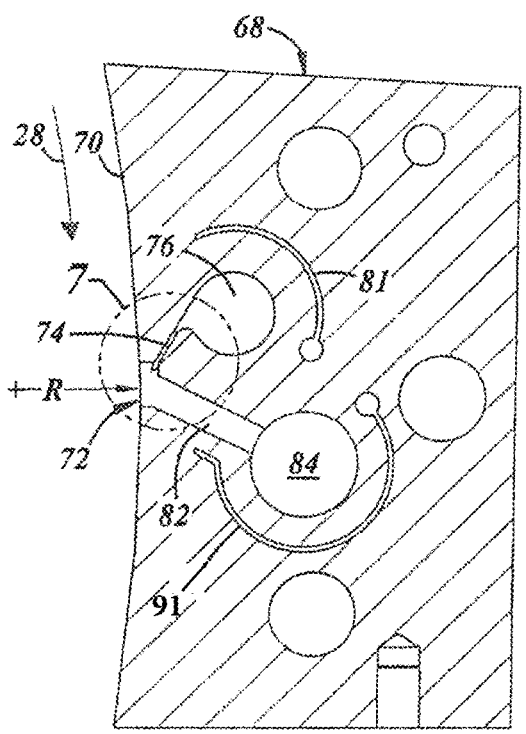
FIG. 6 is an enlarged sectional view taken on line 6-6 of FIG. 5.
Figure 7:
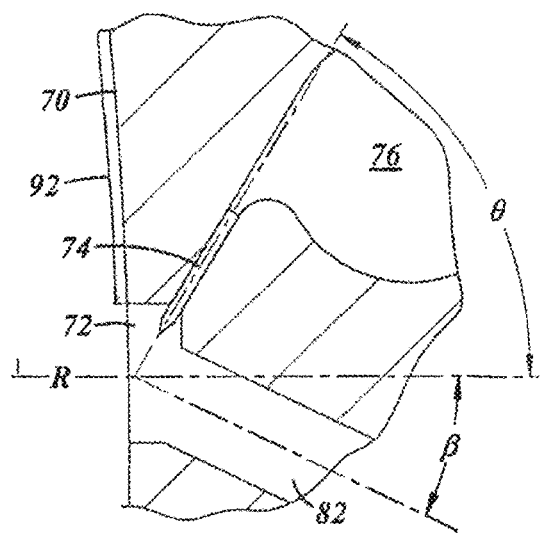
FIG. 7 is an enlarged fragmentary view of the portion of FIG. 6 in the circle 7.

FIG. 5 illustrates the shoe 36 for dispensing molten lead into a mold cavity 32 of a rotating drum 22 for continuously casting a web 38 of a plurality of connected grids. As shown in FIGS. 5 and 6 this shoe may have a body 68 with a generally arcuate front face 70 with an axially elongate orifice slot 72 therein which may confront a rotating drum (such as drum 22) and may extend axially or longitudinally generally parallel to the axis of rotation 28 of the drum. The longitudinal length of the orifice slot 72 may extend across the entire axial width of the mold cavity 32 including the lug portion of the mold cavity. In use, excess molten lead may be supplied to the orifice slot 72 through a longitudinally extending supply slot 74 (FIGS. 6 and 7) which may open into an upper recessed portion of the orifice slot 72 and may extend longitudinally substantially the whole longitudinal length of the orifice slot. Desirably the supply slot 74 is inclined downwardly toward the face 70 generally in the direction of rotation 28 of the drum past the orifice slot 72 to facilitate flow of both molten lead into the portion of the mold cavity passing the slot and the return of excess molten lead from the orifice slot. As shown in FIG. 7, the supply slot 74 may be inclined downwardly (generally in the direction of rotation of the drum) at an acute included angle Ø relative to a radius R of the drum extended through the arcuate center of the orifice slot 72 in the range of about 50° to 70°, desirably 55° to 65° and preferably about 60°.

As shown in FIGS. 6 and 7, the upstream end of this supply slot 74 opens into a molten lead supply passage 76 which may extend axially throughout the length of the shoe body 68 and communicate with an inlet connector 78 at one end of the body and an outlet connector 80 at the other end of the body. Generally, radially outward of the supply passage 76, an arcuate isolator slot 81 may extend generally axially throughout the body to decrease the thermal transfer of heat from molten lead in the supply passage to the body of the shoe.

In use, more molten lead is supplied through the supply slot 74 to the orifice slot 72 then is dispensed into the mold cavity 32 of the rotating drum and the excess molten lead is returned from the orifice slot through a return slot 82 which communicates with the orifice slot downstream of the supply slot 74 and is inclined downwardly away from the orifice slot 72 relative generally to the direction of rotation of the drum. As shown in FIG. 7 the return slot 82 may be inclined downwardly away from the orifice slot 72 at an acute included angle ß relative to an extension of the radius R of the drum through the arcuate center of the orifice slot 72 that may be in the range 20° to 40°, desirably 25° to 35° and preferably about 30°. This return slot is longitudinally elongate and desirably may extend the entire longitudinal length of the recess of the orifice slot 72. The minimum cross-sectional area of the return slot 82 may be on the order of four to ten times greater than the minimum cross-sectional area of the supply slot 72, desirably six to eight times greater than that of the supply slot, and preferably about seven times greater than that of the supply slot.

The downstream end of the return slot 82 may communicate with and open into a return passage 84 extending generally axially through the body 68 of the shoe 36 and communicating at one end with a molten lead inlet connector 86 and at the other end with a molten lead outlet connector 88. An arcuate isolator slot 91 generally radially outward of the return passage may extend through the body 68 of the shoe to reduce heat transfer from molten lead in the return passage and the return slot to the shoe body.

When casting a continuous web of battery grids, molten lead dispensed from the orifice slot 72 into the circumferential grooves of the drum mold cavity 32 tends to flow upstream counter to the direction of rotation of the drum. Therefore, to inhibit this upstream flow, as shown in FIGS. 5 and 8 the shoe 36 has a series of axially spaced apart ribs 90 & 92 extending circumferentially upstream from the upper edge of the orifice slot and projecting radially outwardly from the arcuate face 70 of the shoe with each rib in cross section configured to be closely received in an associated circumferential groove of the mold cavity 32 in which one of the longitudinal grid wires is cast. As shown in FIG. 9, the ribs 90 received in the cavity grooves in which the intermediate longitudinal wires 54 are cast may be smaller in or otherwise have a different cross-sectional area than that of the ribs 92 (FIG. 10) received in the circumferential grooves in the mold cavity in which the top and bottom longitudinal wires 58, 60 of the grid are cast. Typically, a top wire 58 of a grid and its associated rib 92 may have a larger cross-sectional area than that of a bottom wire 60 and its associated rib. The exterior surfaces of each rib 90, 92 may be designed and constructed to have a slight clearance with the corresponding surface of its associated groove of the mold cavity 32 of about 0.000 to 0.003 thousandths of an inch.

As shown in FIG. 5, the orifice slot 72 and the associated portions of the supply and return passages or slots 74, 82 extend generally axially or longitudinally significantly beyond or outboard of the mold cavity 32 groove forming the top frame wires 58 to extend across and desirably slightly beyond the axial extent of the recesses of the mold cavity forming the lug 52 of the battery grids of the continuous web. It has been empirically determined that the construction, arrangement and orientation of the orifice 72, and supply and return slots 74, 82 improves the casting and integrity of each lug 52 and the homogeneity of its merging into and attachment with the associated frame wire 58 of the cast grids and significantly decreases if not essentially eliminates any cold welding and seams between them. This is believed to be due to significantly less upfill or upflow of molten lead relative to the direction of rotation the drum as the initial portion of the mold cavity recess forming the cast lug 52 moves downwardly into registration with this portion of the orifice slot 72 and the molten lead entering this recess remains in a molten condition for a sufficient period of time to result in a flowing together and homogeneous casting of the lug with the adjoining frame wire as this wire is being cast and solidifies throughout the longitudinal and lateral extent of the attachment and merging of the lug into this frame wire. Regardless of any theoretical explanation, it has been empirically determined that improvement of this cast lug and lug wire interface occurs even though the temperature of the molten lead supplied to the shoe is at a lower temperature than that of prior art shoes.

The minimum cross sectional flow area of the orifice slot 72 through the confronting face is significantly greater than the minimum cross sectional flow area of the supply slot 74 and in some implementations may be in the ratio or range of 8:1 to 15:1 and desirably in the ratio range of 9:1 to 11:1. In one practical implementation the orifice slot has a width of 0.270 of an inch, the supply slot has a width of 0.025 of an inch and each has a longitudinal length of 4.787 inches. In at least some implementations, a minimum cross sectional flow area of the orifice slot 72 may be substantially equal to or greater than the minimum cross sectional flow area of the return slot 82 and may be in the ratio or range of 1:1 to 3:1 and desirably in the ratio or range of 1:1 to 2:1. In one practical implementation the orifice slot 72 has a width of 0.270 of an inch, the return slot 82 has a width of 0.180 of an inch and each has a longitudinal length of 4.787 inches. In at least some implementations, the minimum cross sectional flow area of the return slot 82 is substantially greater than the minimum cross sectional flow area of the supply slot 74 and may be in the ratio or range of 5:1 to 10:1 and desirably 6:1 to 9:1. In one practical implementation the return slot 82 has a width of 0.180 of an inch, the supply slot has a width of 0.025 of an inch and each has a longitudinal length of 4.787 inches. In at least some implementations a shoe may be used in a continuous casting machine to produce a web of a plurality of continuously cast grids each having for example a longitudinal length A of 5.8 inches and a nominal transverse width B of 5.2 inches, a thickness of 0.04 of an inch, and weighing about 1.5 ounces of a lead alloy.

The orifice slot 72 and associated separate supply and return slots 74 & 82 extending longitudinally or axially across the mold cavity 32 of the drum has the significant practical advantages of providing longer periods of continuous casting of webs of connected battery grids without having to clean out and remove dross, solidified lead particles and other contaminants from the shoe, the ability to continuously cast webs at a lower molten lead temperature and lower shoe temperature, a significantly increased maximum production rate, improved grain structure of the lead of the cast grids, significantly improved lug structure and integrity of the cast grids, improved control of the continuous casting process, and improved castability of lead alloys particularly lead alloys commonly used in lead acid battery grids including lead antimony alloys. As used in this description and the claims, the terms lead, molten lead and cast lead include without limitation both essentially pure metallic lead and a wide variety of lead alloys including without limitation lead alloys with one or more of calcium, antimony, selenium, copper, tin, aluminum, silver, arsenic, barium, bismuth, etcetera.

Figure 11:
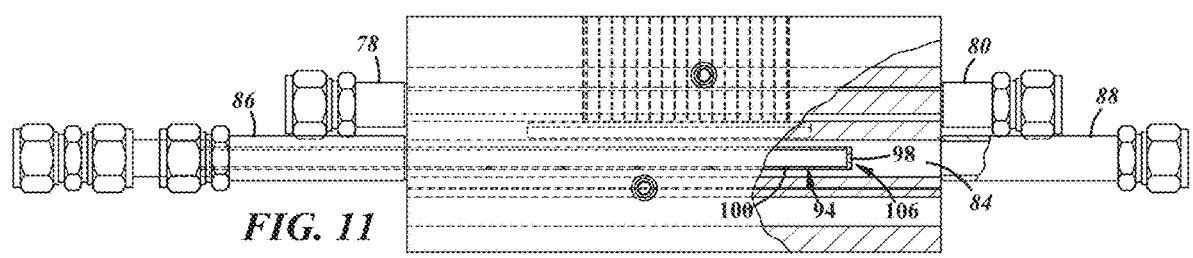
FIG. 11 is a back view of the shoe of FIG. 5 with a portion broken away and in section to illustrate an optional return passage molten lead return tube in the shoe.
Figure 12:
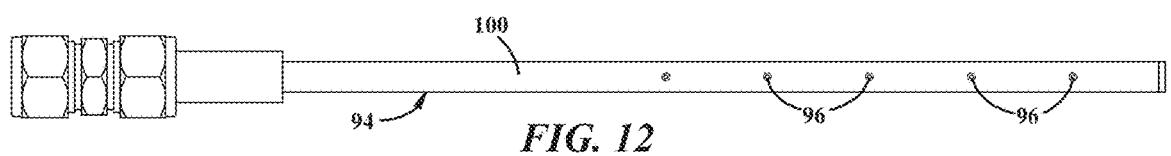
FIG. 12 is a side view of the return tube.
Figure 13:
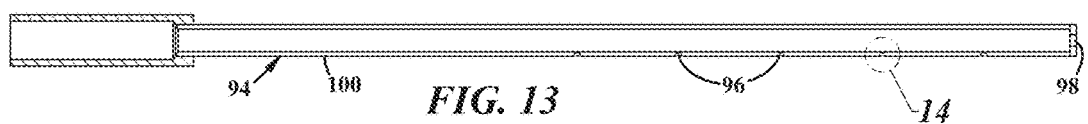
FIG. 13 is a sectional view of the return tube.

FIG. 11 illustrates an optional addition to the shoe 36 of a return passage molten lead return tube 94 which improves the return of excess lead from the orifice slot 72 through the return slot 82. In use, molten lead is supplied to the return passage 84 through this return tube which when received in the return passage may dispense molten lead through both a series of longitudinally spaced apart holes or apertures 96 through its side wall as shown in FIGS. 11-13 and/or through a restricted orifice 98 in the downstream end of the tube. As shown in FIG. 14, the holes 96 in the side wall 100 of the tube may have a cylindrical bore 102 which merges into a frustoconical opening 104 outwardly through the wall.

The end of the tube 94 with the restricted orifice 98 may be disposed near the outlet end of the return passage 84 and in use is believed to provide a nozzle which with the return passage 84 forms an inductor or jet pump 106 which decreases the pressure of the molten lead in the orifice slot and increases the flow rate at which excess molten lead may be removed from the recess of the orifice slot 72 through the return slot 82. Regardless of any theoretical explanation, the use of this return tube improves the casting of the lugs 52 and the adjoining portion of the wires 58 and permits a higher flow rate of excess molten lead through the shoe which is believed to permit the supply of molten lead to the orifice slot 72 at a lower temperature and thus molten lead in the mold cavity 32 solidifies in less time which enables a higher or faster production rate of cast webs of continuous grids. In some applications this may permit molten lead to be supplied to the supply passage 76 at a temperature in the range of 50° C. to 80° C. above the solidification temperature of the lead and enable the maximum production rate of cast webs to be increased by 30% to 50% greater than that achieved with prior art shoes of continuous casting machines. This also improves the integrity of the cast lug 52 and the metallurgical grain structure of the cast grids.

In use of the shoe 36 in a continuous casting machine it is desirable to be able to supply molten lead at different pressures and different flow rates to the supply passage 76 and the separate return passage 84. One way in which this may be readily achieved is to use separate molten lead pumps 42 in a common furnace 46 or separate furnaces with separate pumps to supply molten lead to each of these passages. For example, the outlet of a first pump 42 may be connected by a suitable conduit 104 to the inlet 78 of the supply passage 76 and the outlet 80 of the supply passage may be connected by a suitable conduit 106 to return excess molten lead to the melting pot 44 of the furnace 46. A second pump (not shown) of either the same or a separate furnace may be connected by a suitable conduit 108 to the inlet 86 of the separate return passage 84 and molten lead flowing through the outlet 88 of this passage may be returned by a suitable conduit 110 to a melting pot 44 of either the same or a second furnace. If each pump is driven by a separate variable speed electric motor 30 the flow rate and pressure of the molten lead supplied to each of the supply passage 76 and return passage 84 may be readily varied and controlled as desired to optimize the production rate and the quality of the battery grids 50 of a continuously cast web produced by the casting machine in which the shoe 36 is utilized.

Figure 15:
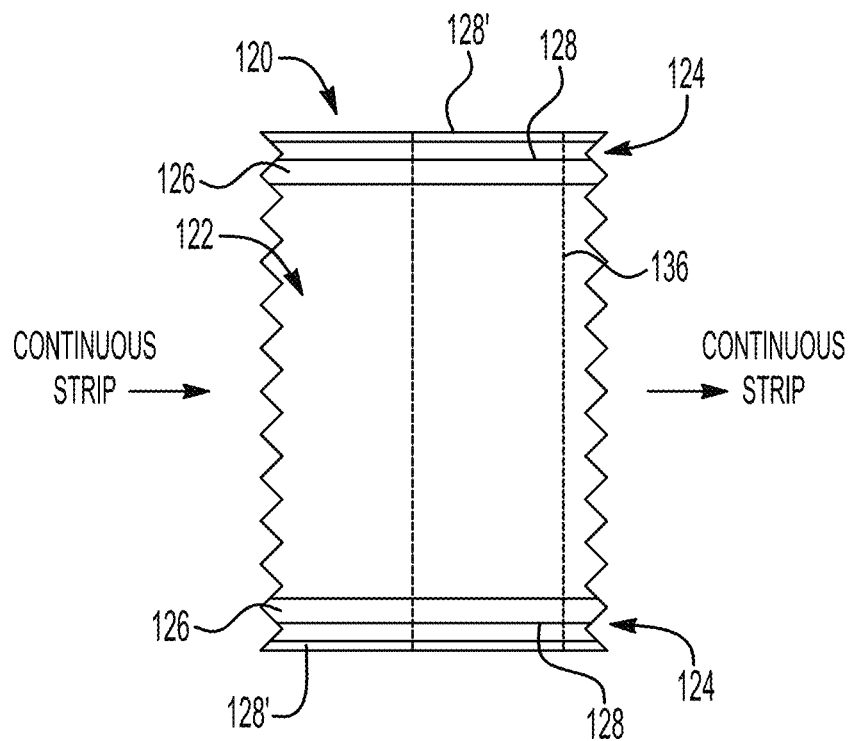
FIG. 15 is a fragmentary plan view of a longitudinally elongate composite strip of a carbon fiber material with a lead conductor ribbon attached along each elongate edge of the strip of carbon fiber material.
Figure 16:
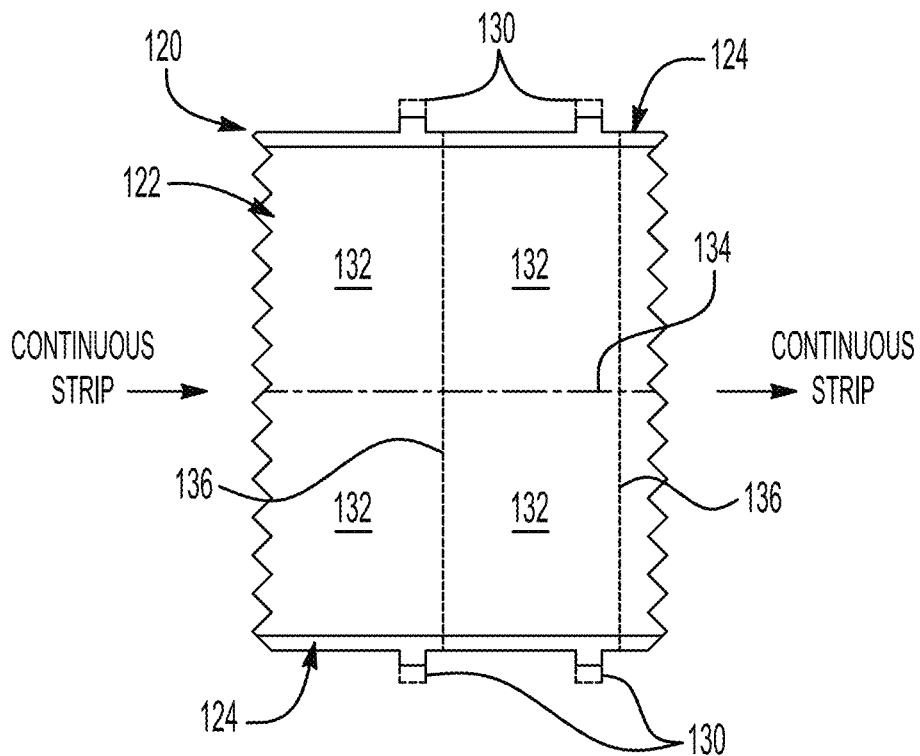
FIG. 16 is a fragmentary plan view of the longitudinally elongate composite strip of FIG. 15 with lugs of each lead conductor ribbon.

FIG. 15 illustrates a longitudinally elongate composite web or strip 120 of electrically conductive carbon fiber material 122 with a longitudinally elongate electrically conductive cast lead or lead alloy ribbon 124 (hereinafter lead ribbon) attached to each longitudinal edge 126 of the carbon fiber material. Each lead ribbon may have retainers desirably in the form of uniformly longitudinally spaced apart and transversely extending ribs 128 and 128' in each lead ribbon formed when casting the lead ribbon 124 to the carbon fiber material 122. During casting and solidification, the ribs 128 resist movement of the ribbon 124 relative to the drum due to friction with the shoe and may provide locators for subsequent operations such as severing the strip 120 into individual electrodes. FIG. 16 illustrates the elongate composite strip 120 in which each lead ribbon 124 includes equally longitudinally spaced apart lugs 130 which may be formed either when casting the lead ribbons or by subsequently stamping, punching, severing or otherwise cutting away portions of each cast ribbon 124 to form the lugs thereof. To form individual electrodes 132 of carbon fiber material with a lead ribbon attached along one edge, all forms of the elongate strip 120 may be severed longitudinally as indicated by the broken line 134 and transversely as indicated by broken lines 136. Alternatively, a composite longitudinally elongate strip may be formed with a lead ribbon 124 along only one longitudinal edge of a strip of carbon fiber material 122 and severed transversely (at 136) to form a plurality of individual electrodes 132.

Typically, each lead ribbon may have a nominal thickness in the range of about 0.030 to 0.080 of an inch and a transverse width in the range of about 1.2 to 2.0 inches. The carbon fiber material may have a thickness in the range of about 0.030 to 0.180 of an inch and for automotive batteries a transverse width of about 6 to 12 inches and desirably 8 to 10 inches if lead ribbons will be attached along both longitudinal edges and a transverse width in the range of about 3 to 6 inches if a lead ribbon will be attached along only one longitudinal edge. For stationary batteries the carbon fiber material may have a transverse width in the range of about 6 to 12 inches where a lead ribbon is attached along only one longitudinally elongate edge. Typically, the carbon fiber material may include a variety of electrically conductive carbon or graphite fibers (hereinafter both referred to as carbon fiber material), may be several hundred feet in length and be sufficiently flexible so that it may be coiled into rolls. Suitable elongate strips of carbon fiber material commonly referred to as carbon fiber felt are commercially available.

A suitable method of making carbon fiber electrodes 132 includes casting liquid lead or a liquid lead alloy into an electrically conductive lead ribbon 124 along one or both edges 126 or along a mid-portion of a longitudinally elongate strip of carbon fiber material 122 to produce a composite strip 120 or 320 and thereafter severing the carbon fiber material and attached lead ribbon or ribbons to form a plurality of individual electrodes 132. Depending on the desired application and downstream processing of the composite strip 120, each lead ribbon may have ribs 128 and/or lugs 130 cast therein or after casting, lugs 130 subsequently formed by various punching, stamping, cutting, shearing, and/or severing operations which remove portions of the cast lead ribbon 124 to form the lugs of the cast lead ribbon.

Figure 17:
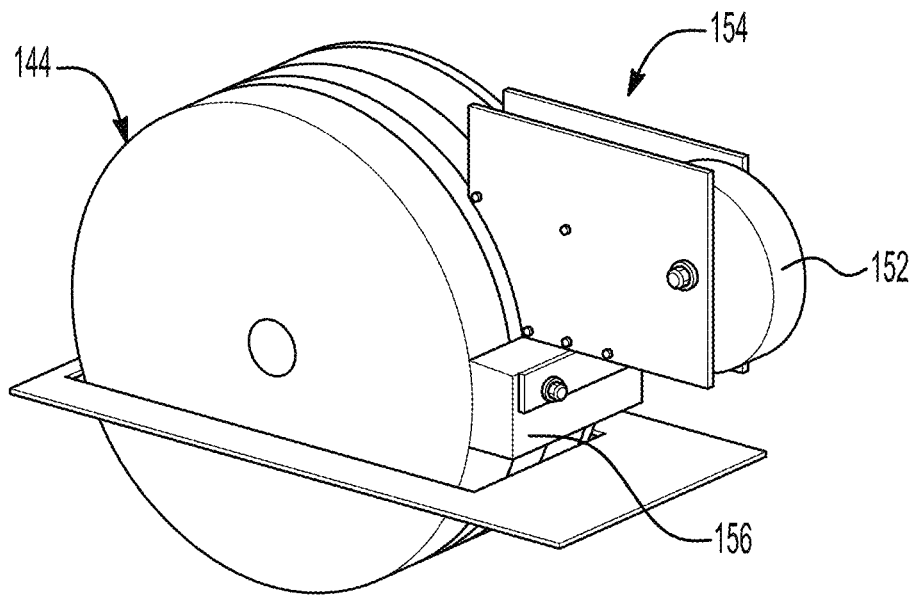
FIG. 17 is a semi-schematic perspective view of a device for unwinding a roll of an elongate strip of carbon fiber material and feeding it onto a drum in the machine of FIGS. 1 and 2.
Figure 18:
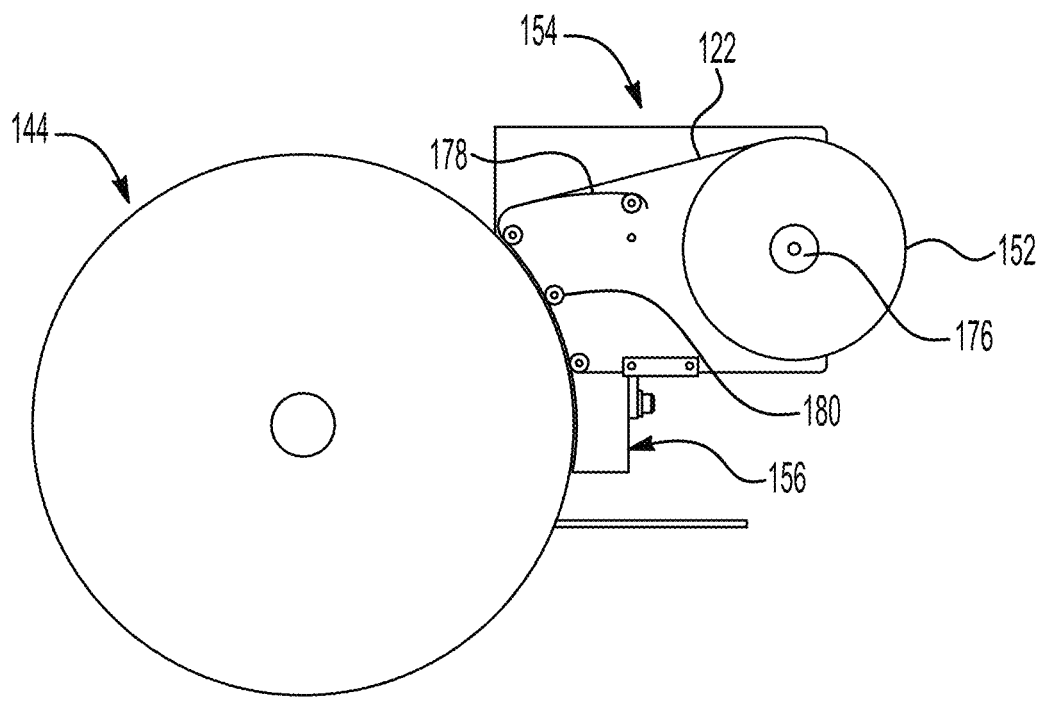
FIG. 18 is a semi-schematic side view with portions broken away of the device of FIG. 17.
Figure 19:
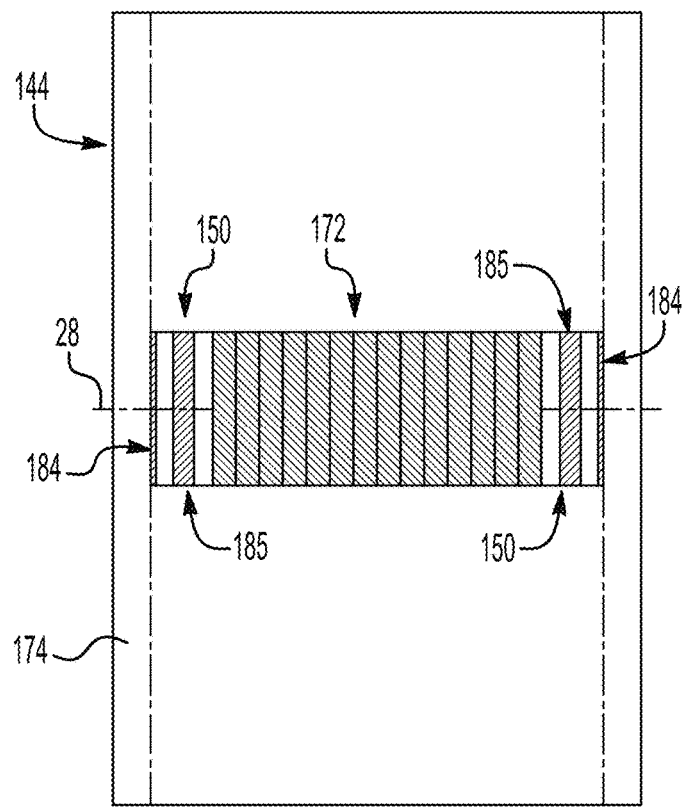
FIG. 19 is a side view of a casting drum including a portion of its cavities for casting the lead conductor ribbons of the composite strip of FIGS. 15 and 16 which may be used with the machine of FIGS. 1 and 2.

A casting drum 144 (FIG. 19) and shoe 156 (FIGS. 25 & 26) may be used with the machine 20 to continuously cast a conductive lead or lead alloy ribbon 124 attached along both edges 126 of a longitudinally elongate strip 122 of carbon fiber material. Portions of a longitudinally elongate strip 122 of a carbon fiber material may be received on the rotating casting drum 144 and the drum may have cavities 150 (FIGS. 19-23) for casting continuous lead ribbons 124 attached to one or both longitudinally extending edges of the carbon fiber strip of material. As shown in FIGS. 17 and 18, a roll 152 of the carbon fiber material may be unwound and disposed on the rotating drum 144 by an uncoiling device 154. In operation of the machine 20, liquid lead is supplied through the shoe 156 to a portion of the cavities 150 to cast and attach the lead ribbons 124 along both longitudinal edge portions of the carbon fiber strip 122 of material. Liquid lead under pressure may be supplied to the shoe from the lead pot 44 of the melting furnace 46 by the pump 42. Typically, the liquid lead may be supplied to the shoe 156 by the pump at a super-atmospheric pressure and a temperature in the range of about 700 to 1,100 degrees F. The drum 144 may be at an average temperature usually in the range of about 200° F. to 400° F. The composite strip 120 of carbon fiber material with lead ribbons 124 attached thereto is removed from the drum as a longitudinally elongate continuous composite strip 120 which may thereafter be severed into individual electrodes 132.

Figure 20:
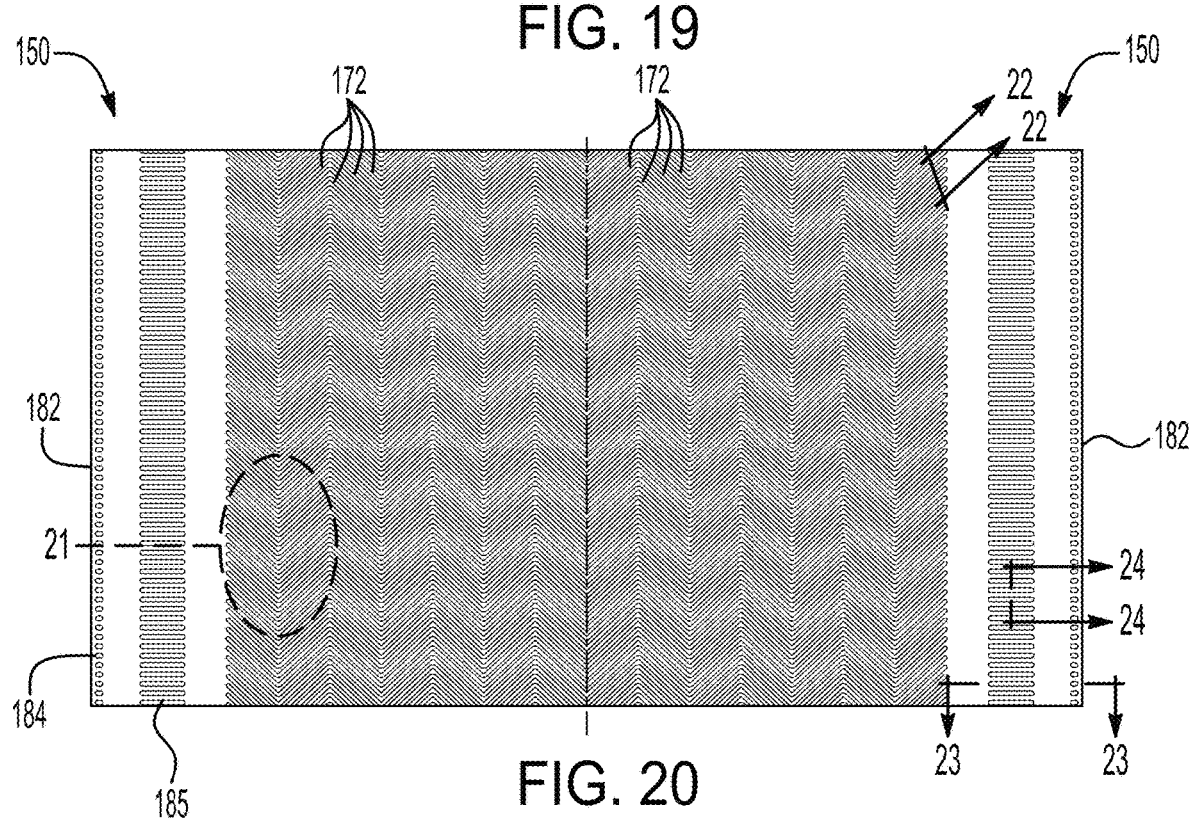
FIG. 20 is an enlarged view of a portion of the periphery of the casting drum of FIG. 19.
Figure 21:
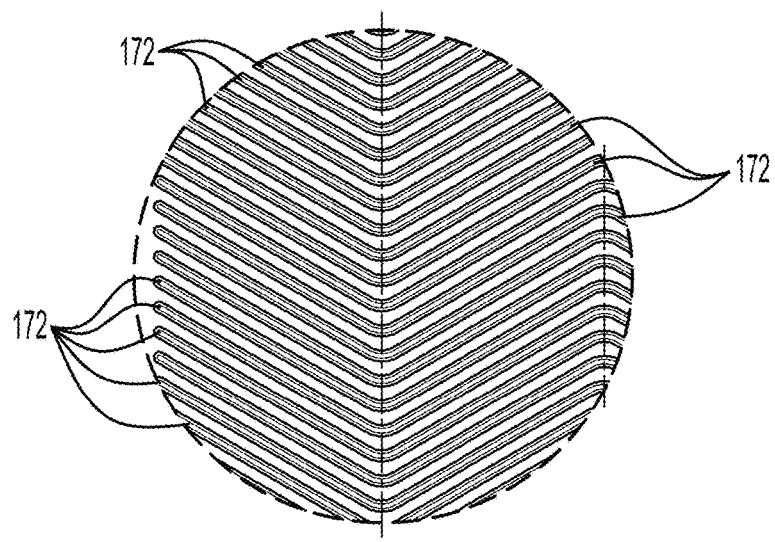
FIG. 21 is an enlarged view of the portion in the circle 21 of FIG. 20.
Figure 22:
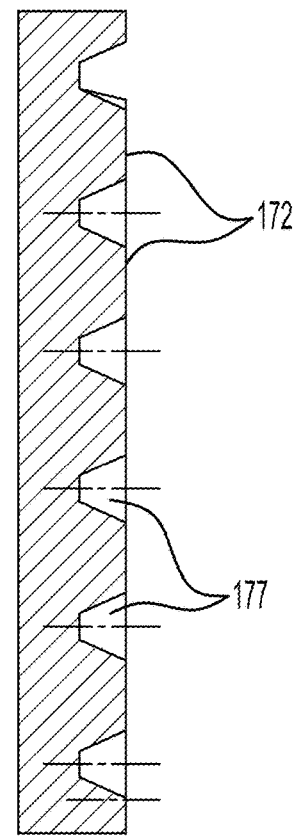
FIG. 22 is an enlarged fragmentary sectional view taken on line 22-22 of FIG. 20.

For retaining a portion of the carbon fiber strip 122 of material on the drum 144 while the lead ribbons 124 are cast thereon, as shown in FIGS. 20-22, a plurality of circumferentially spaced apart lands 172 arranged in a zig zag pattern are disposed circumferentially continuously around a peripheral surface 174 of the drum. As shown in FIG. 22, the lands may have a face width of about 0.03 of an inch, a depth of about 0.02 of an inch, be spaced apart about 0.03 of an inch, and may be inclined at an acute included angle of about 30° to the axis of rotation 28 of the drum. The lands may be formed by grooves 177 in the peripheral surface 174 of the drum. The groove side walls may be inclined at about 25° with a width of about 0.03 of an inch at the peripheral surface 174 of the drum. In operation of the machine 20, these lands bear on and in cooperation with the shoe slightly compress the strip of carbon fiber so that it does not move relative to the drum while the lead ribbons 122 are cast thereon. As shown schematically in FIGS. 17 & 18 the unwinding device 154 disposes succeeding portions of the carbon fiber strip 122 onto the rotating drum 144 and into engagement with the lands 172. This unwinding device 154 may include an arbor 176 on which a roll 152 of the strip 122 of carbon fiber material may be rotatably received, a guide band 178 for directing portions of the strip as it is unrolled onto the rotating drum, and rollers 180 for guiding the strip onto the lands 172 as it passes between the rollers and the rotating drum. Desirably the rollers 180 extend transversely across the entire width of the strip 122 and are journaled to freely rotate in response to rotation of the drum 144 and the advancement of the carbon fiber strip 122 onto the drum. Of course, persons of ordinary skill may readily devise other devices for applying successive portions for a strip 122 of a carbon fiber material onto the rotating drum 144 and into engagement with the lands 172.

Figure 29:
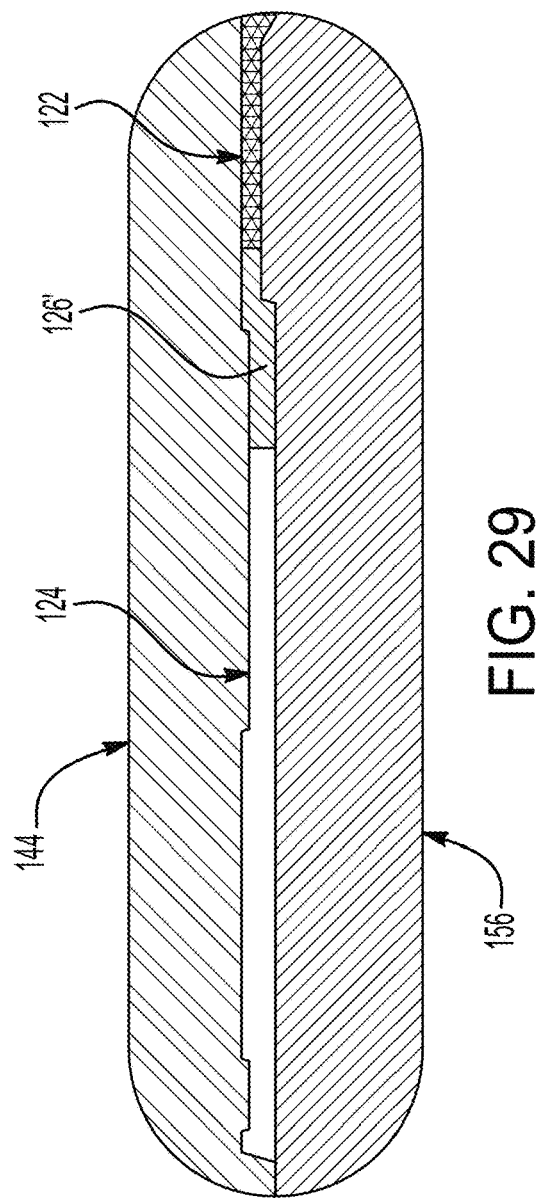
FIG. 29 is an enlarged view of the portion in the circle 29 of FIG. 28.
Figure 30:
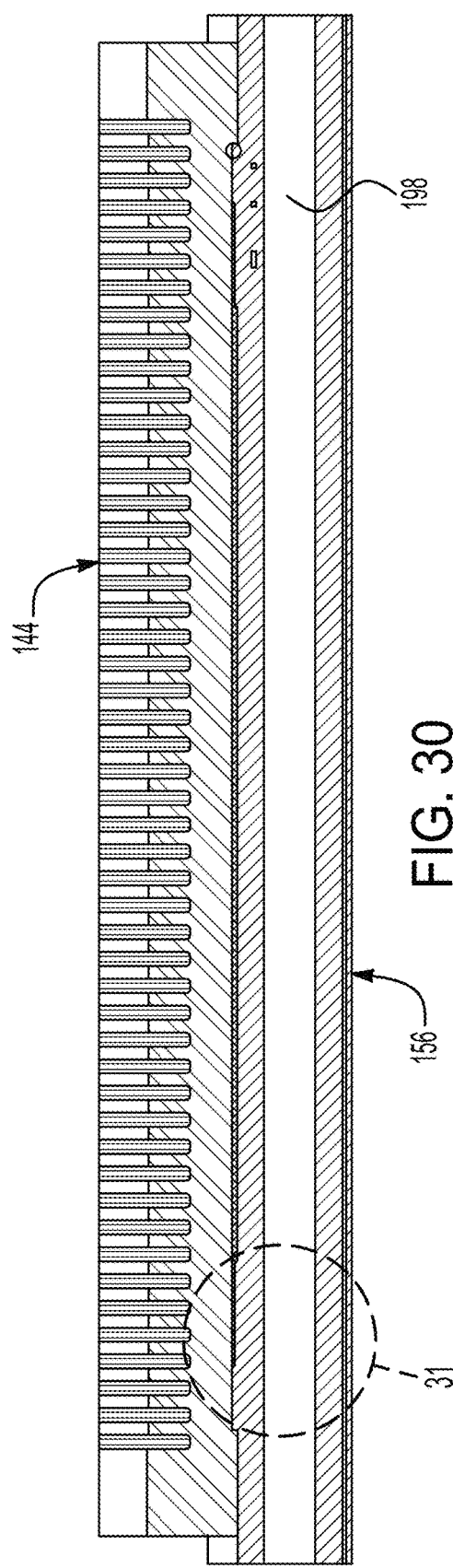
FIG. 30 is an enlarged fragmentary sectional view taken on line 30-30 of FIG. 27.
Figure 31:
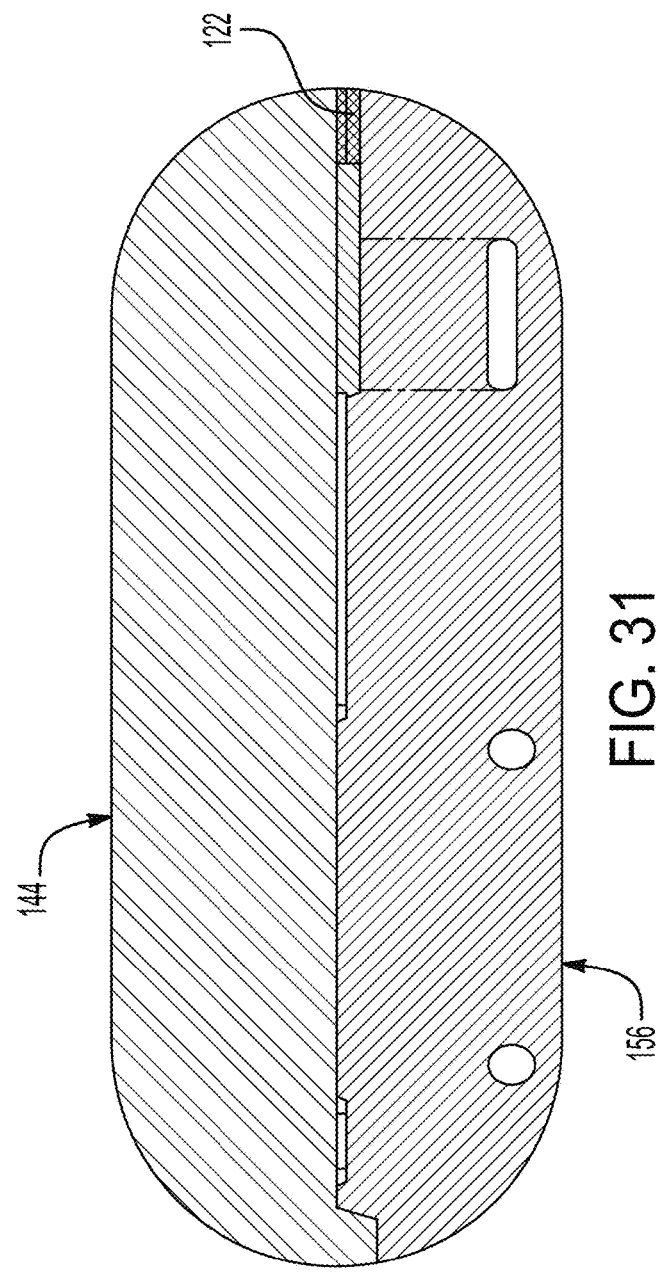
FIG. 31 is an enlarged view of the portion in the circle 31 of FIG. 30.
Figure 32:
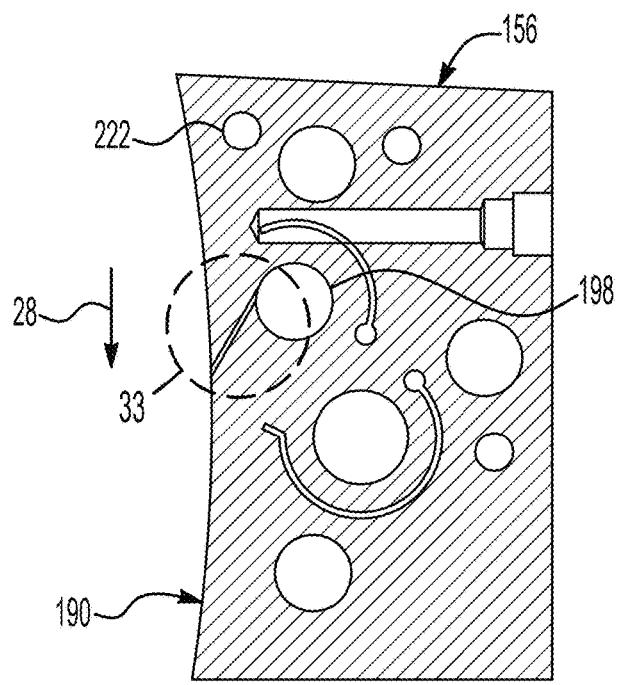
FIG. 32 is a sectional view taken on line 32-32 of FIG. 25.

For casting each lead ribbon 124, the drum 144 may have a separate cavity 150 (FIG. 20) recessed in and extending circumferentially continuously around the peripheral surface of the drum. For making the composite strip 120 with a cast lead ribbon 124 attached to each longitudinal edge 126 of a carbon fiber strip, two separate cavities 150 may be provided each adjacent to and in use somewhat underlapping one of the longitudinal edges 126 of the strip 122 of carbon fiber. Each cavity underlaps and may also overlap an adjacent edge portion 126 of the carbon fiber material and desirably has a circumferentially continuous land 182 which limits the generally axial extent to which liquid lead flows generally axially outward of the cavity. As shown in FIG. 29, to at least some extent, the liquid lead penetrates into an edge portion 126' of the carbon fiber material extending into the cavity and when solidified attaches or secures the lead ribbon to the carbon fiber materials and provides an electrically conductive path or conductor for the carbon fiber material. In some instances, the liquid lead may saturate at least part of the edge portion of the carbon fiber material.

Figure 23:
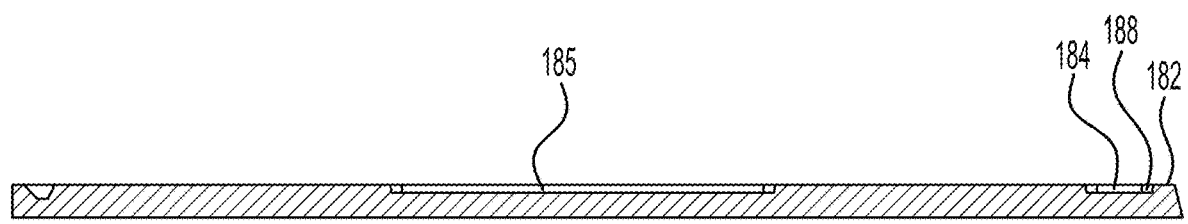
FIG. 23 is an enlarged fragmentary sectional view taken on line 23-23 of FIG. 20.
Figure 24:
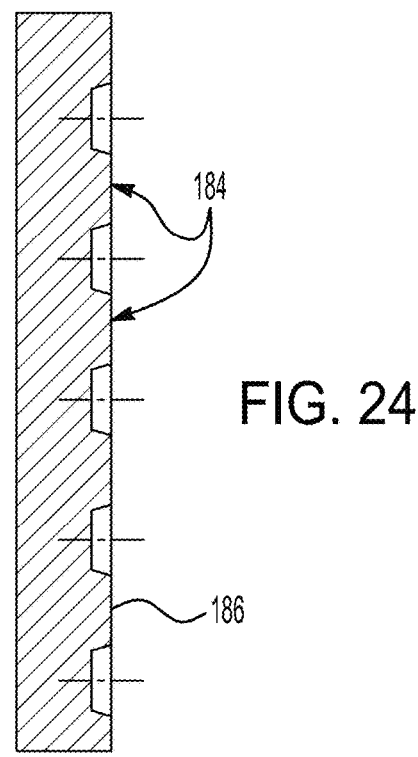
FIG. 24 is an enlarged fragmentary sectional view taken on line 24-24 of FIG. 20.

Desirably to cast a lead ribbon 124 having a surface with a plurality of circumferentially spaced apart and transversely extending cogs or ribs 128 & 128', each cavity 150 may have a plurality of circumferentially spaced apart and axially extending bars or lands 184 & 185 (FIGS. 20 & 23) in the cavity and disposed completely around the cavity. As shown in FIGS. 23 & 24, each land 184 & 185 extends generally radially outward of the base of the cavity and may have a height equal to or less than the depth of the cavity so that the outer face 186 of each land is disposed in or radially below or inboard of the peripheral surface 174 of the drum. The generally axial outer edge 188 of each cavity is desirably axially outboard of the adjacent end of the lands 184. As shown in FIGS. 23 & 24, each cavity 150 may have an axial width of about 1.6 inches, each land 184 may have an axial length of about 0.08 of an inch and a radial depth of about 0.01 of an inch, and each land 185 may have an axial length of about 0.54 of an inch and a radial depth of about 0.01 of an inch. Each land 184 and 185 may have a transverse width of about 0.035 of an inch and the lands may be circumferentially spaced apart about 0.035 of an inch (0.070 of an inch center to center). The axial space between the rows of lands 184 and 185 may be about 0.47 of an inch and the axial space between the row of lands 185 and the adjacent end of the lands 172 may be about 0.48 of an inch. The serrations, cogs, ribs or lands 184 & 185 ensure that while the cast ribbons are solidifying and are still being carried by the rotating drum 144, they do not move or shift generally circumferentially with respect to the portion of the strip 122 of carbon fiber on the drum to which they are joined or attached and after removal from the drum they may provide locators to facilitate further downstream processing of the elongate composite strip 120 such as for advancing the strip through a die for punching locator holes, forming lugs 130 on of the lead ribbons, pasting the composite strip, trimming the strip, cutting or severing the composite strip into individual battery electrodes, etc.

Figure 25:
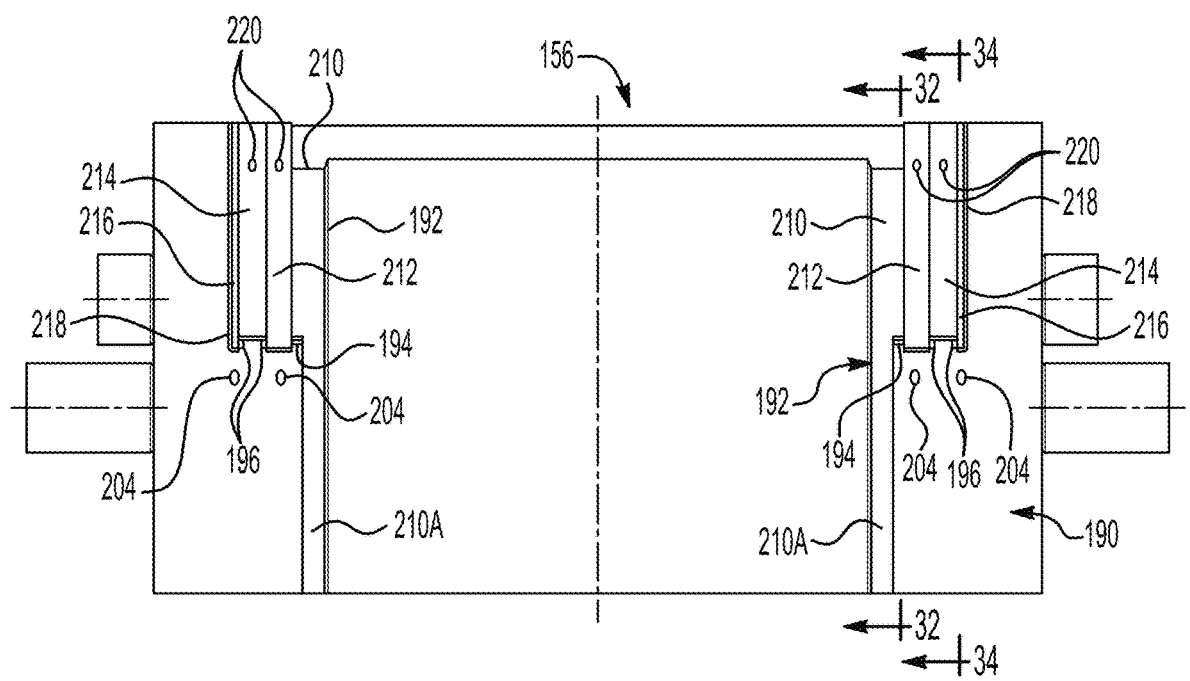
FIG. 25 is a front view of a shoe for use with the casting drum of FIG. 19.
Figure 26:
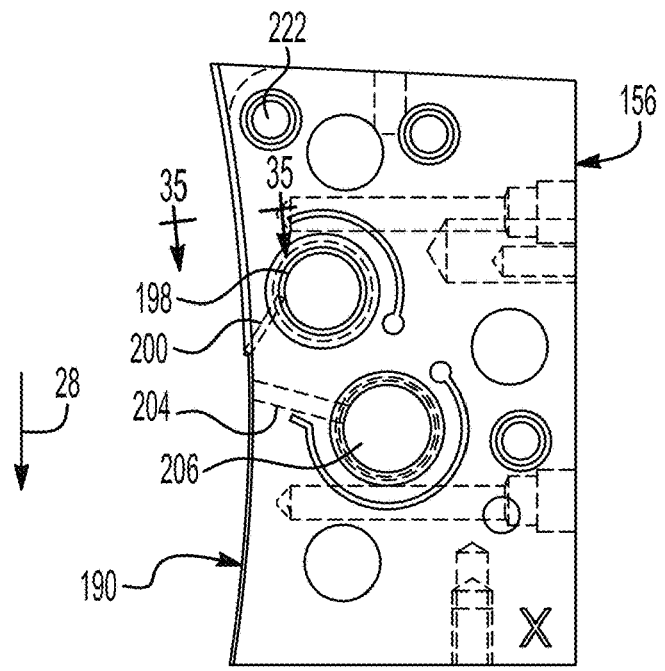
FIG. 26 is an end view of the shoe of FIG. 25.
Figure 27:
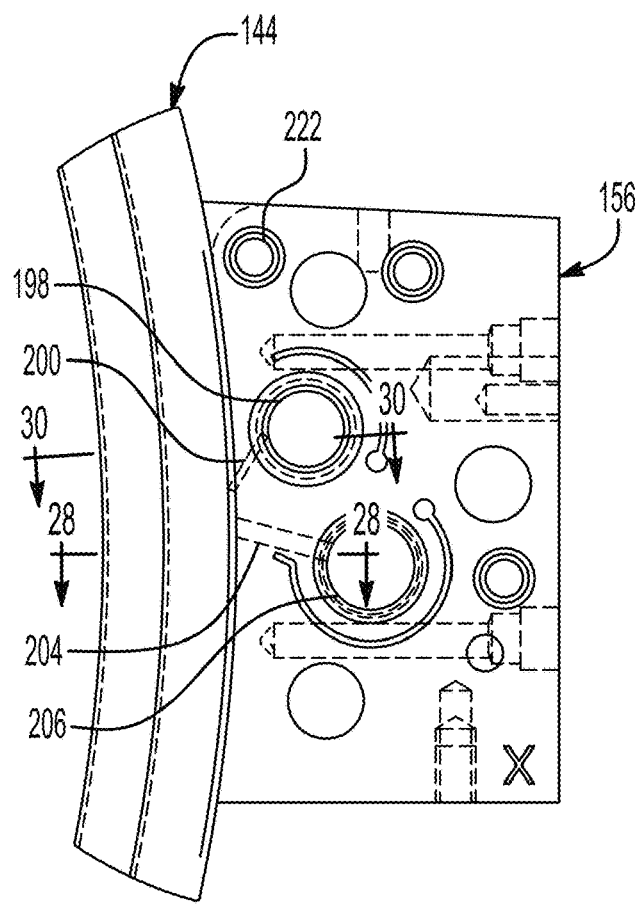
FIG. 27 is an end view of the shoe of FIG. 25 confronting the drum of FIG. 19.
Figure 28:
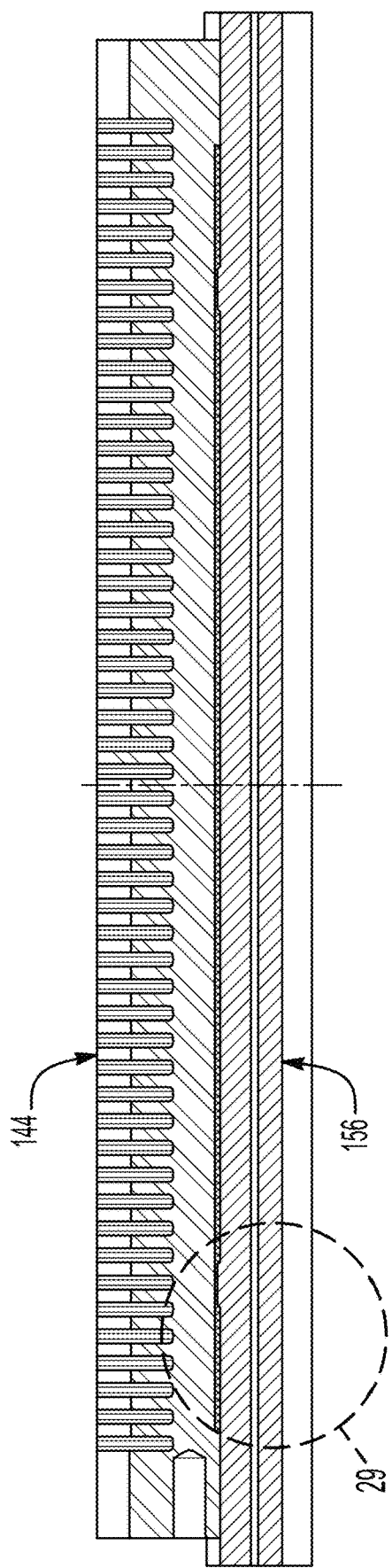
FIG. 28 is an enlarged fragmentary sectional view taken on line 28-28 of FIG. 27.
Figure 33:
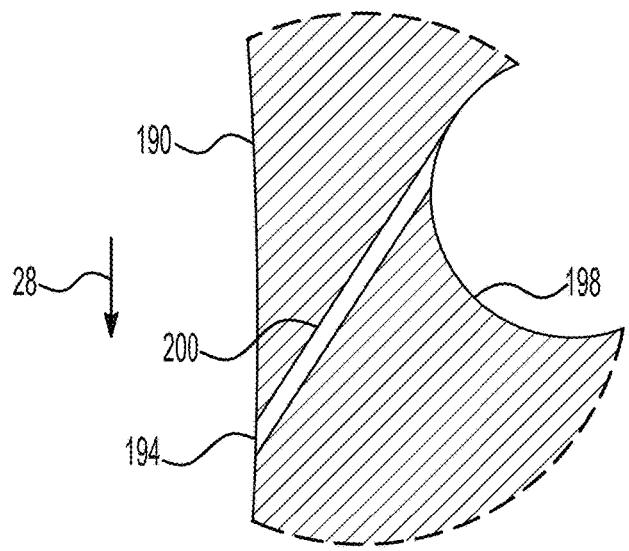
FIG. 33 is an enlarged view of the portion in the circle 33 of FIG. 32.
Figure 34:
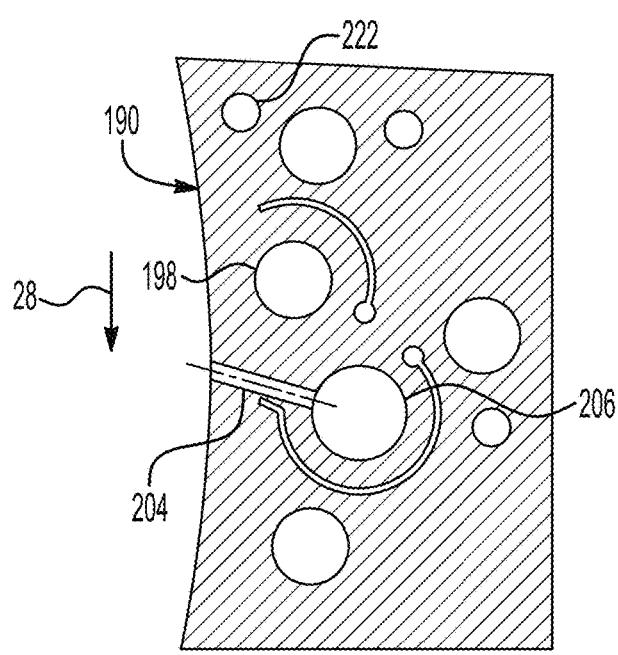
FIG. 34 is a sectional view taken on line 34-34 of FIG. 25.

In operation of the machine 20, liquid lead is supplied to each cavity 150 of the rotating drum 144 through the shoe 156. As shown in FIGS. 25 and 26 the shoe 156 has an arcuate outer face 190 for complimentary mating engagement with a portion of the periphery of the drum 144. The shoe 156 may supply liquid lead to each cavity 150 of the drum through separate orifices 192 opening through the arcuate face 190 of the shoe. Desirably each orifice 192 may have outlet openings 194 & 196, slightly spaced apart from each other. The opening 194 may have a generally rectangular configuration and may be elongate and disposed longitudinally generally parallel to the axis of rotation 28 of the drum. Typically, the opening 194 of the orifice through the face 190 has an axial extent in the range of about 0.15 to 0.25 and desirably about 0.18 of an inch and in assembly with the drum and in use (FIGS. 27-29) overlies an edge portion 126 of the strip 122 of carbon material. Two openings 196 of the orifice may be separate bores or circular each with a diameter in the range of about 0.02-0.04 and desirably about 0.03 of an inch, axially separated or spaced apart about 0.35 of an inch, and in assembly with the drum desirably overly the area between the lands 184 & 185 of the drum 144. As shown in FIGS. 25 & 26 liquid lead may be supplied under pressure to a bore or passage 198 extending generally axially through the shoe 156 which may open onto the orifice outlet openings 194 through a passage 200 which desirably has a generally rectangular cross section corresponding to and the same size as the opening 194 (0.03 by 0.18 of an inch). The passage 200 may be inclined at an acute included angle of about 60 degrees relative to a radius of the arcuate face extending through the orifice as shown in FIG. 33. Desirably each of the openings 196 communicates with the lead supply bore 198 through a separate bore which is also inclined at an acute included angle of about 60 degrees relative a radius of the arcuate face 190 extending through such opening 196. Each of the passages 200 and the bores for openings 196 extends downwardly toward its associated opening in the face relative to the direction of rotation 28 of the drum 144. In use excess liquid lead not entering the cavities is returned through each of desirably two bores or circular passages 204 (FIG. 34) each opening through the outer face 190 and communicating with an excess liquid lead discharge or outlet bore 206 extending axially through the shoe. Each return bore 204 opens into the face 190 downstream of the openings 194 and 196 relative to the direction of rotation 28 of the drum, may have a diameter of about 0.12 of an inch, may be inclined at an acute included angle of about 10 to 20 and desirably 15 degrees relative to a radius of the arc of the face extending through the opening 204, and extends downwardly away from the opening relative to the direction of rotation of the drum. Collectively the passages 194, 196, and 204 tend to direct liquid lead generally circumferentially into each cavity 150 of the rotating drum 144 and in its direction of rotation 28 to facilitate casting of the solid lead ribbons 124. Excess liquid lead flowing through the shoe 156 heats it and ensures liquid lead at a desired temperature is supplied to each cavity 150.

Figure 35:
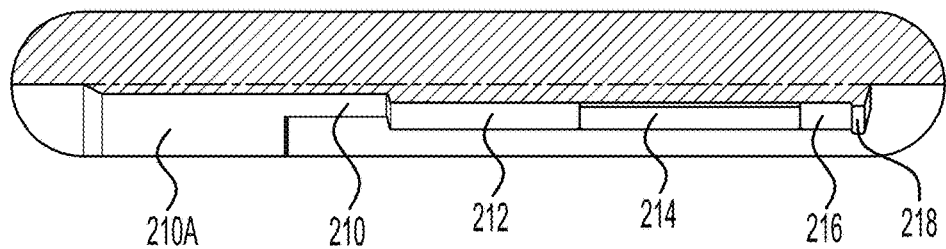
FIG. 35 is an enlarged sectional view taken on line 35-35 of FIG. 26.

In use, to inhibit liquid lead from flowing upstream relative to the direction of rotation 28 of the drum, as shown in FIGS. 26 and 35 a series of ribs 210, 212, 214, 216, and 218 project outwardly from the face 190 of the shoe 156 and extend generally upward of the orifice 192 relative to the direction of rotation 28 of the drum. In operation of the machine 20, the rib 218 may also tend to inhibit and reduce the extent of outward axial flow of liquid lead from the outlets 196 of each cavity 150. In operation of the machine 20, the extent of the axial flow of liquid lead into the carbon fiber strip 122 may also be reduced by compression of a proportion this strip between the circumferential portion 210A of the rib 210 which portion 210A may extend downstream of the orifice 194 of the shoe. However, the extent of this compression must be limited so that the carbon fiber material is not torn or unduly stressed by movement of it by the drum 144 relative to the shoe 156. The extent to which this compression of the carbon fiber material must be limited to avoid tearing or undue stretching of the carbon fiber material may need to be empirically determined depending on various factors including the thickness and density of the strip 122 of the carbon fiber material, the speed at which the drum 144 rotates, the width of this rib portion 210A, etc. It is believed the carbon fiber material may be compressed to 30% to 50% of its uncompressed nominal thickness. For a carbon fiber material having a nominal thickness of about 0.060 of an inch, a rib portion 210A with an axial width of about 0.4 of an inch, and a rotary drum 144 periphery tangential speed of about 80 to 100 lineal feet per minute, a compression of the strip to a thickness of about 0.020 of an inch has been empirically determined to be satisfactory. Suitable carbon fiber materials are believed to be disclosed in U.S. Pat. No. 9,543,589 the disclosure of which is incorporated herein by reference.

If desired to reduce oxidation of the liquid lead during casting of the ribbons an inert gas such as nitrogen may be injected into the casting area such as through small passages 220 of about 0.03 of an inch in diameter opening through ribs 212 and 214 upstream of the orifice relative to the direction of rotation of the drum. The passages 220 may communicate with a bore 222 extending axially through the shoe to which the inert gas may be supplied at a flow rate typically in the range of about 10 to 40 standard cubic feet per hour.

Figure 36:
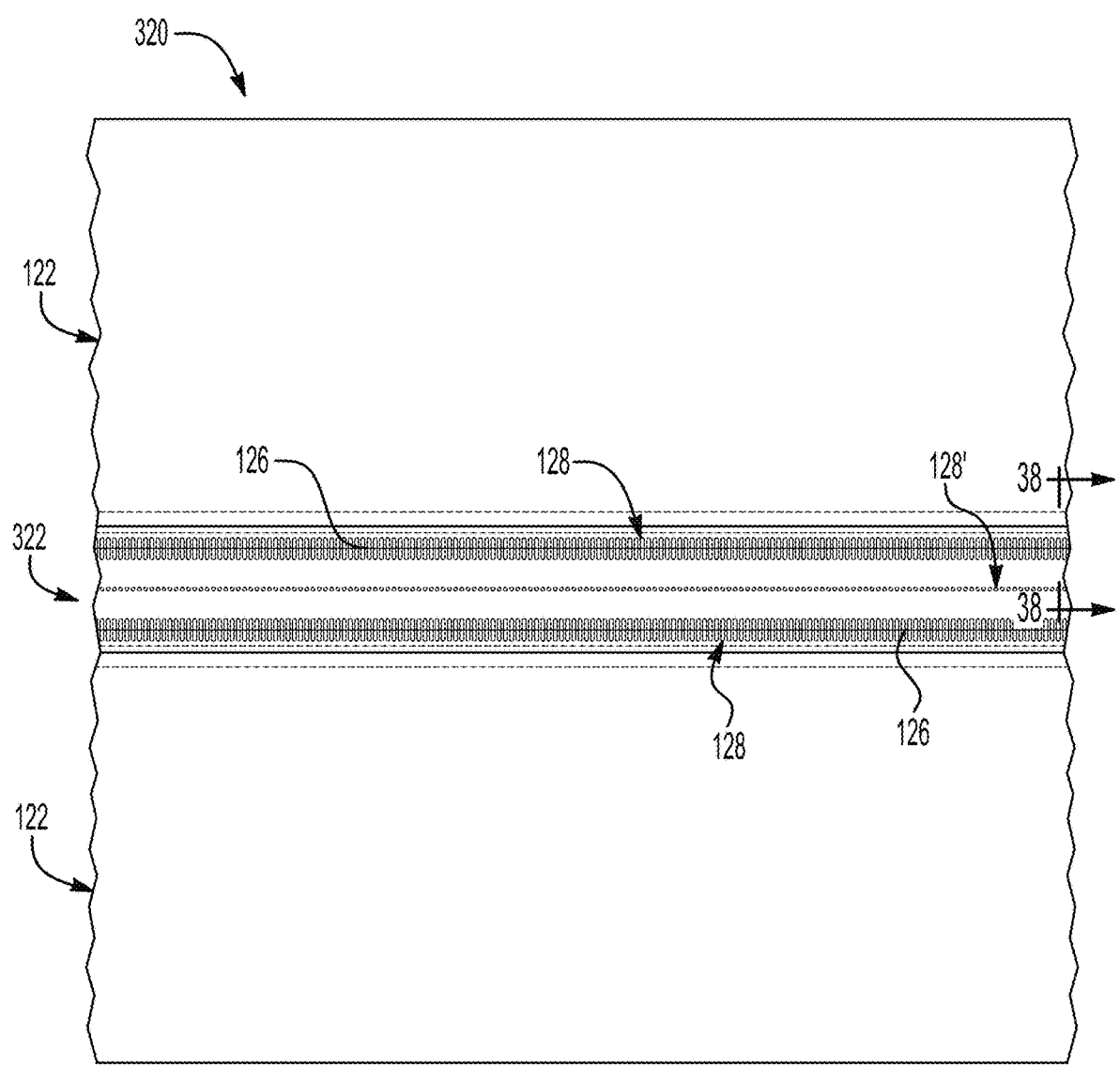
FIG. 36 is a fragmentary plan view of another longitudinally elongate composite strip of a carbon fiber material with a lead conductor ribbon along the mid portion thereof.
Figure 37:
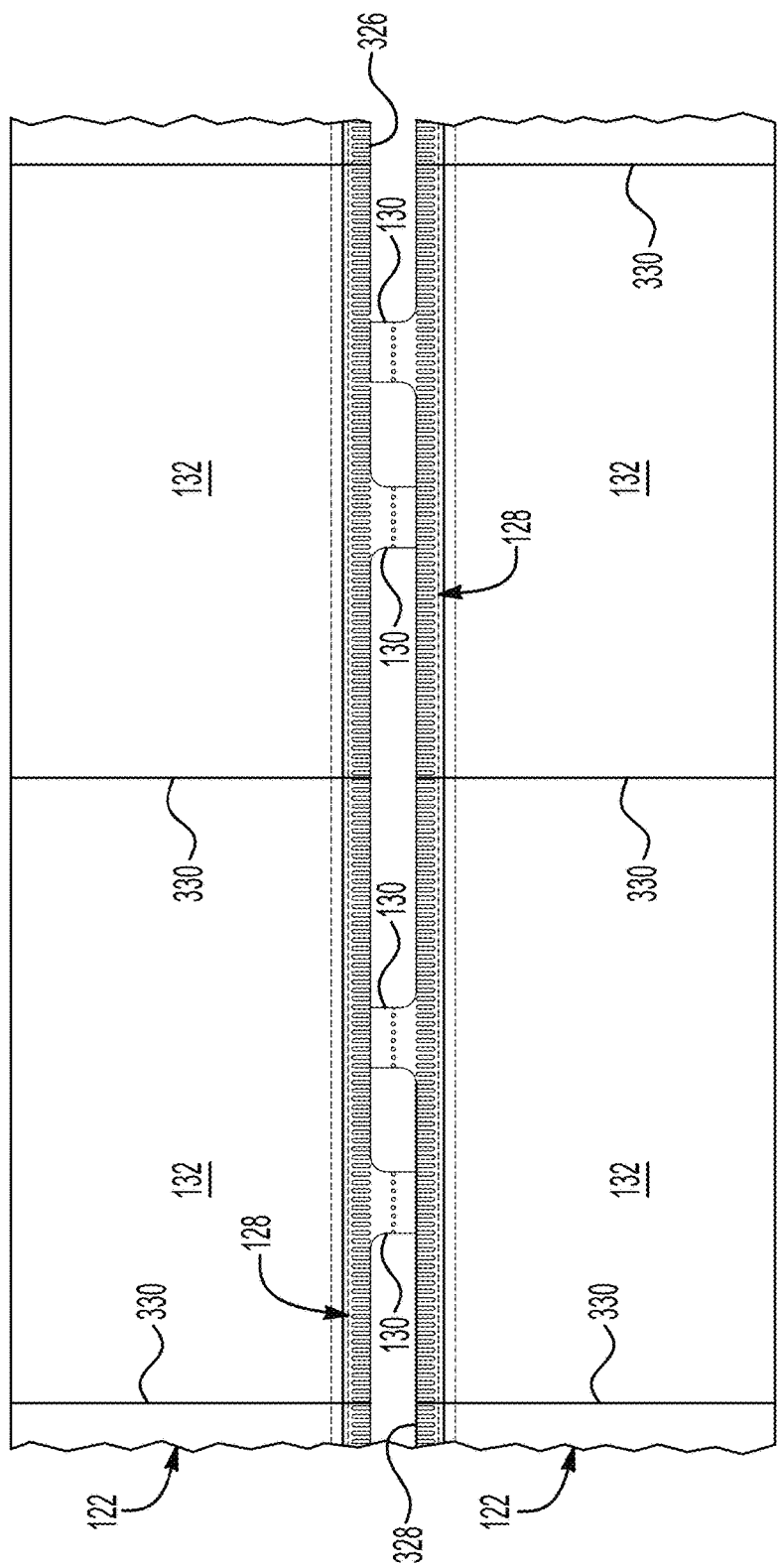
FIG. 37 is a fragmentary plan view of the longitudinally elongate composite strip of FIG. 36 with lugs of the conductor ribbon.
Figure 38:
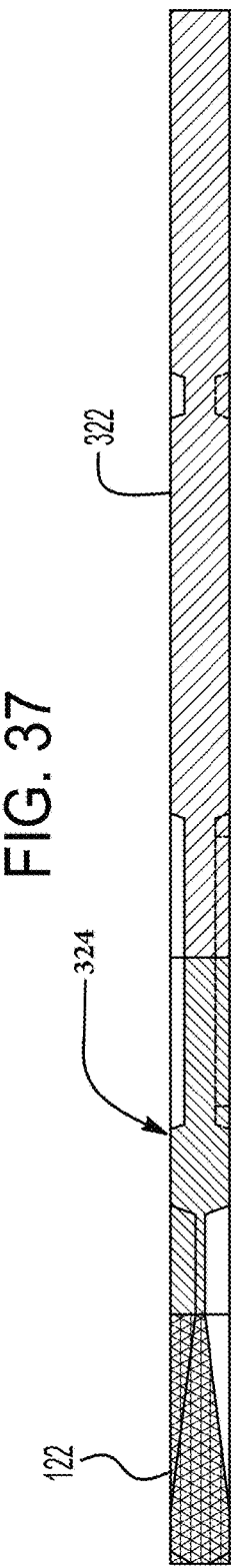
FIG. 38 is a fragmentary sectional view taken on line 38-38 of FIG. 36.

FIG. 36 illustrates another longitudinally elongate composite web or strip 320 of two parallel strips 122 of electrically conductive fiber material with a longitudinally elongate electrically conductive cast lead or lead alloy ribbon 322 attached to their adjacent longitudinal edges 126. The lead ribbon 322 may have two sets of locator indicia desirably in the form of uniformly longitudinally spaced apart and transversely extending ribs 128 and desirably a center transverse rib 128' formed when casting the lead ribbon 322 to the carbon fiber material strips 122. As shown in FIG. 37, after casting and solidification of the lead ribbon 322, it may be generally longitudinally separated and longitudinally spaced apart lugs 130 may be formed on the ribbon by stamping, punching, cutting, severing, or otherwise cutting away portions of the cast ribbon 322 to form the lugs. To form individual composite electrodes 132 of carbon fiber material 122 with a lead ribbon attached along one edge, the elongate web or strip 320 may be severed generally longitudinally along lines 326 & 328 and transversely along lines 330.

Figure 39:
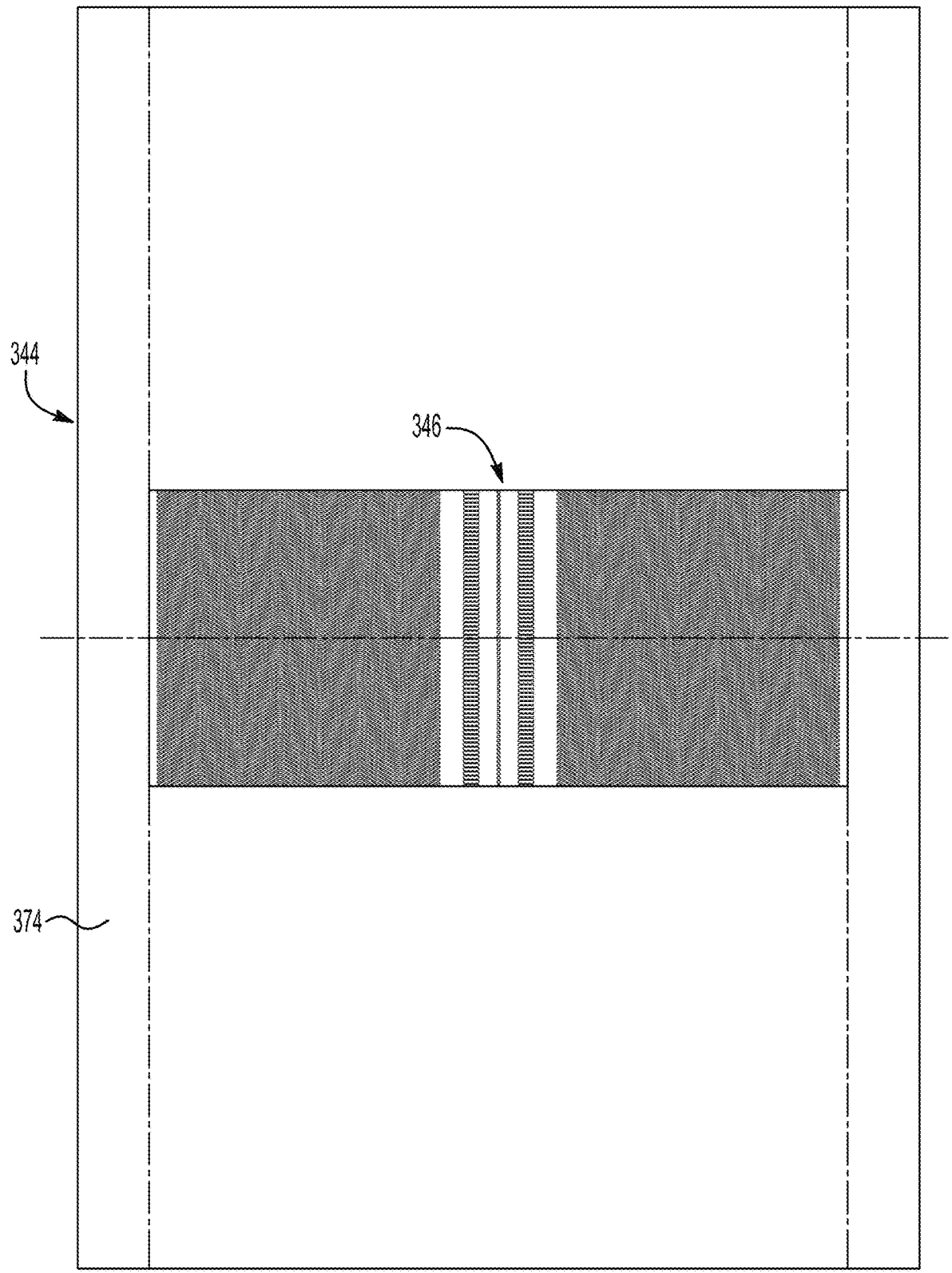
FIG. 39 is a side view of a casting drum including a portion of its cavity for casting the conductor ribbon on the carbon fiber material of the composite strip of FIG. 36.
Figure 40:
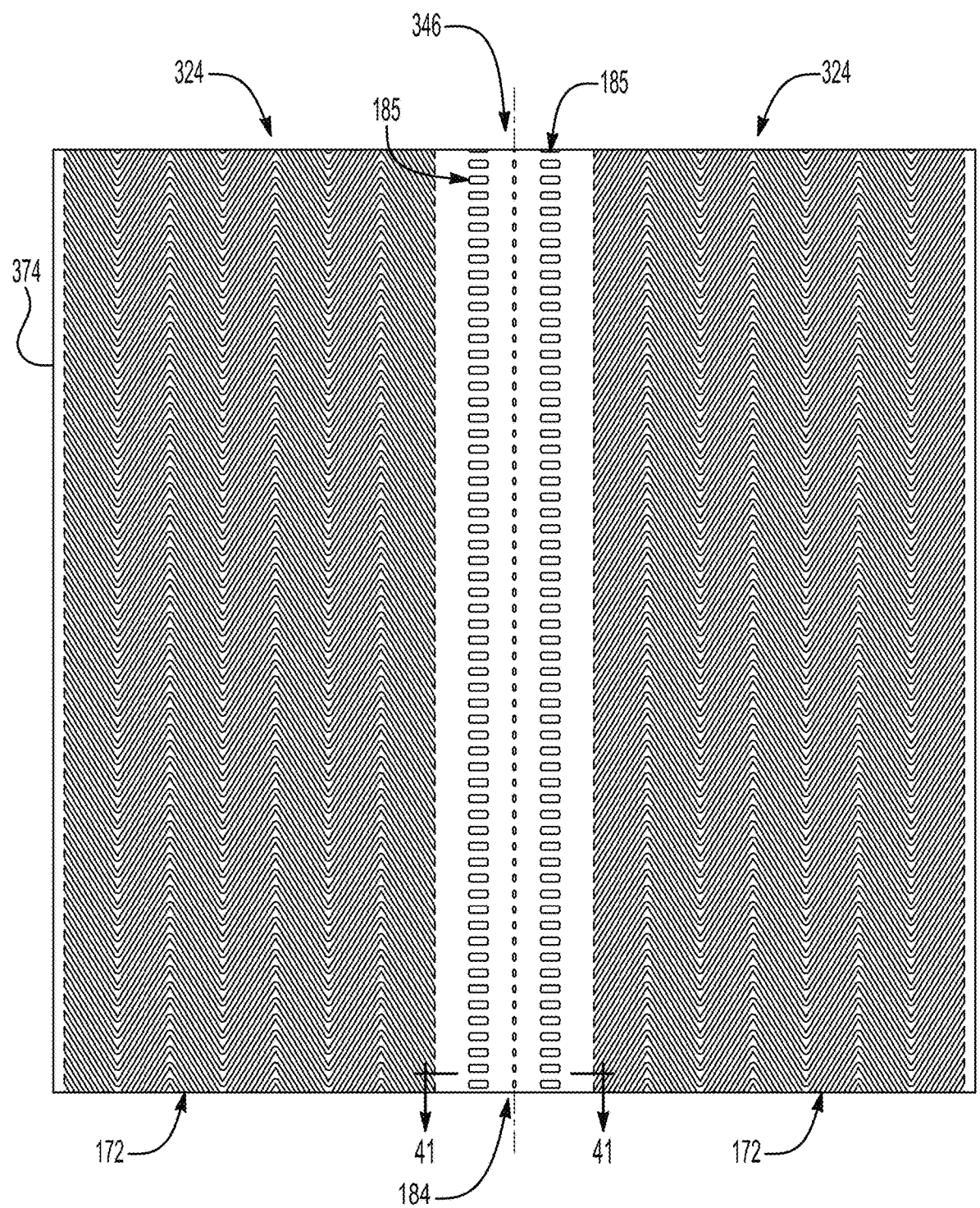
FIG. 40 is an enlarged view of a portion of the periphery of the casting drum of FIG. 39.

A casting drum 344 (FIG. 39) and a complimentary shoe 356 (FIG. 42) may be used with the machine 20 to continuously cast the conductive lead or lead alloy ribbon 322 attached to adjacent edges of two longitudinally elongate strips 122 of carbon fiber material. Portions of the two longitudinally elongate strips 122 of carbon fiber material may be received in parallel on the casting drum 344 and the drum may have a cavity 346 (which may be substantially two cavities 150 merged together) to continuously cast the lead ribbon 322 attached to the two strips 122. As shown in FIGS. 17 and 18, each of two rolls 152 of the carbon fiber material may be unwound and disposed on the rotating drum by one or two parallel uncoiling devices 154. In operation of the machine 20, liquid lead may be supplied through the shoe 356 to the cavity 346 to cast and attach the lead ribbon 322 along the adjacent edges 126 of the two strips 122 of carbon fiber material. Liquid lead under pressure may be supplied from the lead pot 44 of the melting furnace 46 by the pump 42 to the shoe 356. A portion of each carbon fiber strip 122 of material may be retained on the drum 344 while casting the lead ribbon 322 thereon, as shown in FIGS. 39 and 40, by two axially spaced apart rows 324 each of a plurality of circumferentially spaced apart lands 172 arranged in a zig zag pattern and disposed circumferentially continuously around a peripheral surface 374 of the drum. In operation of the machine 20, the unwinding device or devices 154 dispose succeeding portions of the two carbon fiber strips 122 in parallel onto the rotating drum 344 and into engagement with the lands 172.

Figure 41:
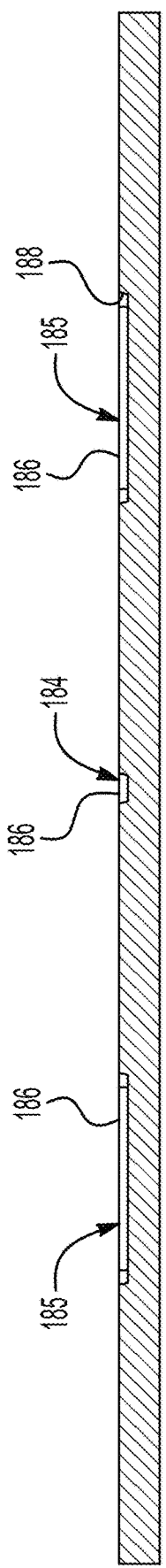
FIG. 41 is an enlarged fragmentary sectional view taken on line 41-41 of FIG. 40 of a casting cavity of the drum of FIG. 39.
Figure 47:
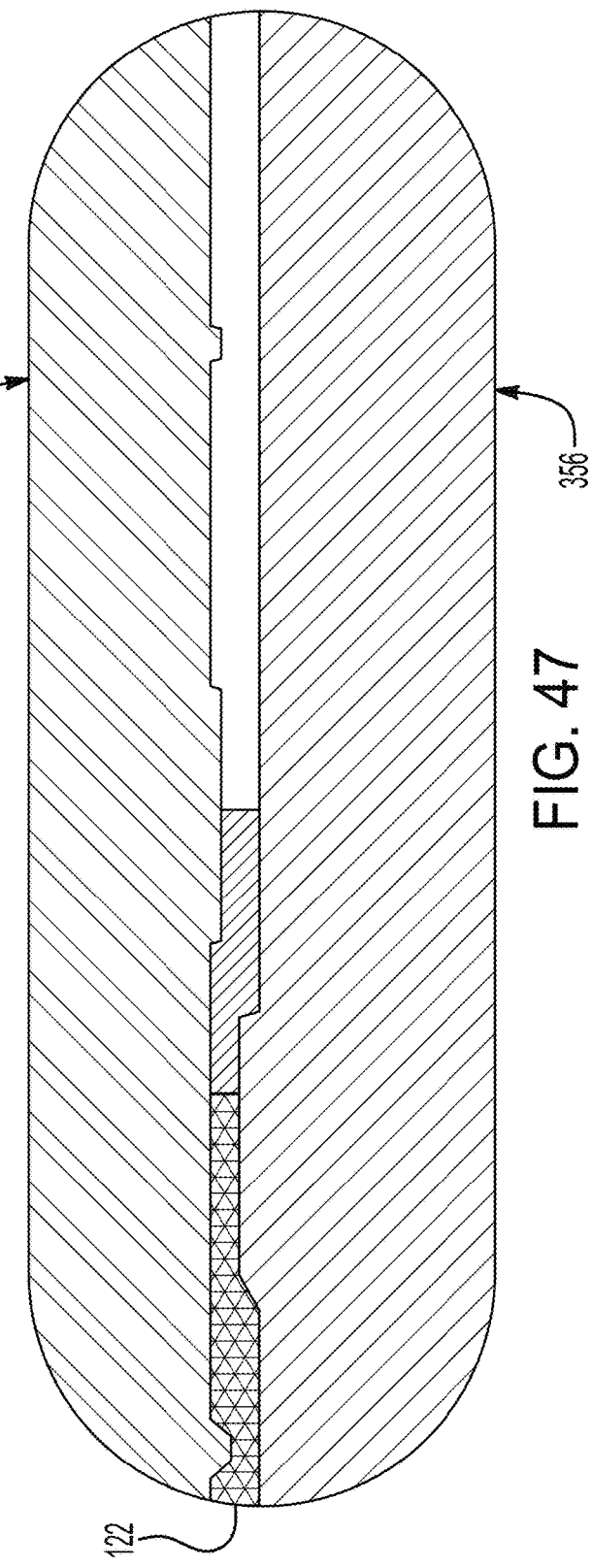
FIG. 47 is an enlarged view of portion in the circle 47 of FIG. 46.
Figure 48:
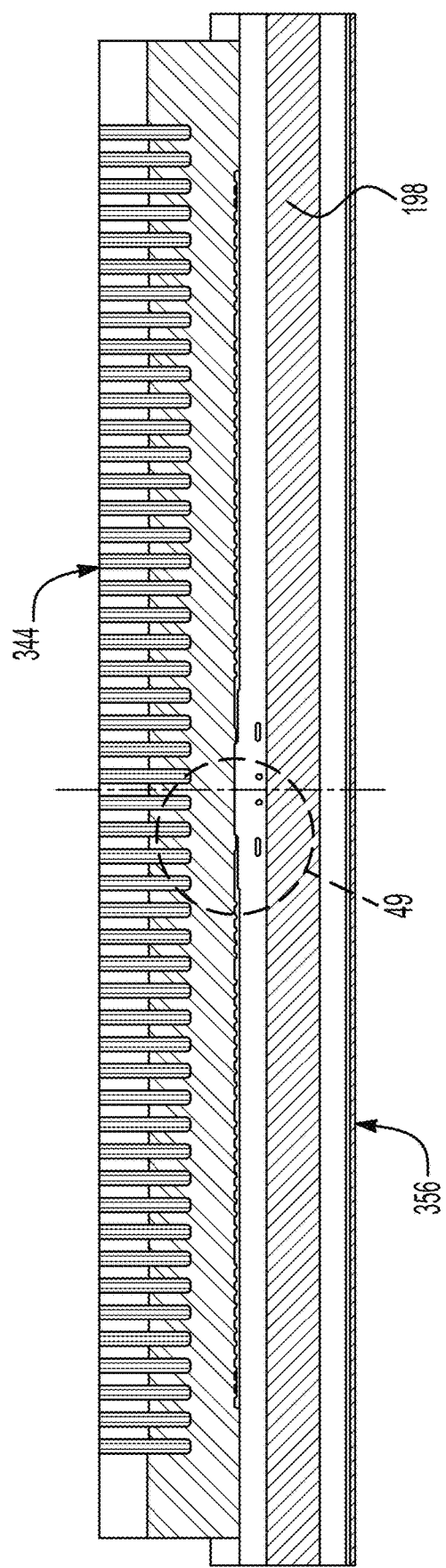
FIG. 48 is an enlarged fragmentary sectional view taken on line 48-48 of FIG. 45.
Figure 49:
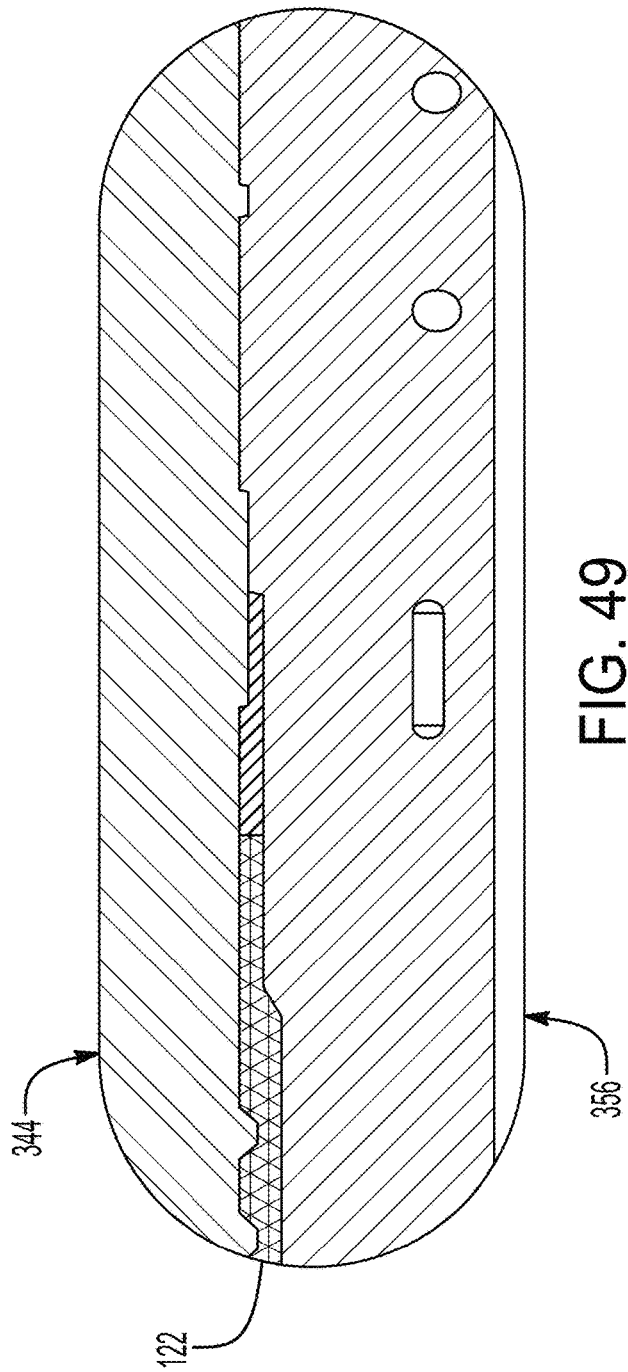
FIG. 49 is an enlarged view of the portion in the circle 49 of FIG. 48.

For casting the lead ribbon 322, the drum 344 may have a cavity 346 (FIGS. 39-41) between the lands 172 and recessed in and extend circumferentially continuously around the peripheral surface of the drum. The cavity 346 underlaps and in conjunction with the shoe may also overlap adjacent edges 126 of the two strips 122 of carbon fiber material. As shown in FIG. 47, to at least some extent, the liquid lead penetrates into a portion of each strip of carbon fiber material and when solidified attaches or secures the lead ribbon 322 to the strips of carbon fiber material and provides an electrically conductive path or conductor for the carbon fiber material. In some instances, the liquid lead may saturate at least part of each strip of carbon-fiber material.

Desirably to cast the lead ribbon 322 with a surface having two spaced apart sets each of a plurality of circumferentially spaced apart and transversely extending cogs or ribs 128, and ribs 128', the cavity 346 may have two spaced apart sets each with a plurality of circumferentially spaced apart and axially extending bars or lands 185 (FIGS. 40&41) in the cavity and disposed completely around the cavity. Optionally, the cavity 346 may also have a row of circumferentially spaced apart bars 184 disposed completely around the cavity and axially spaced from and between the two rows of lands 185. Each of the lands 184 and 185 extends generally radially outward of the base of the cavity and may have a height equal to or less than the depth of the cavity so that the outer face 186 of each land is disposed in or radially below or inboard of the peripheral surface 374 of the drum. The generally axial outer edges 188 of the cavity are desirably axially outward of the lands 185. The cavity 346 may have an axial width of about 1.7 inches. The ribs 184 and 185 ensure that while the lead is solidifying and while the ribbon 322 is still being carried by the rotating drum 344 it does not slip or move generally circumferentially with respect to the portion of the two strips 122 of carbon fiber material on the drum to which it is joined or attached, and after removal from the drum the ribs 185 may provide locators to facilitate further downstream processing of the elongate composite strip 320 such as advancing the strip through a die for punching locator holes, forming lugs 130 on the ribbon, pasting the composite strip, trimming the composite strip, cutting or severing the composite strip into individual battery electrodes, etc.

Figure 42:
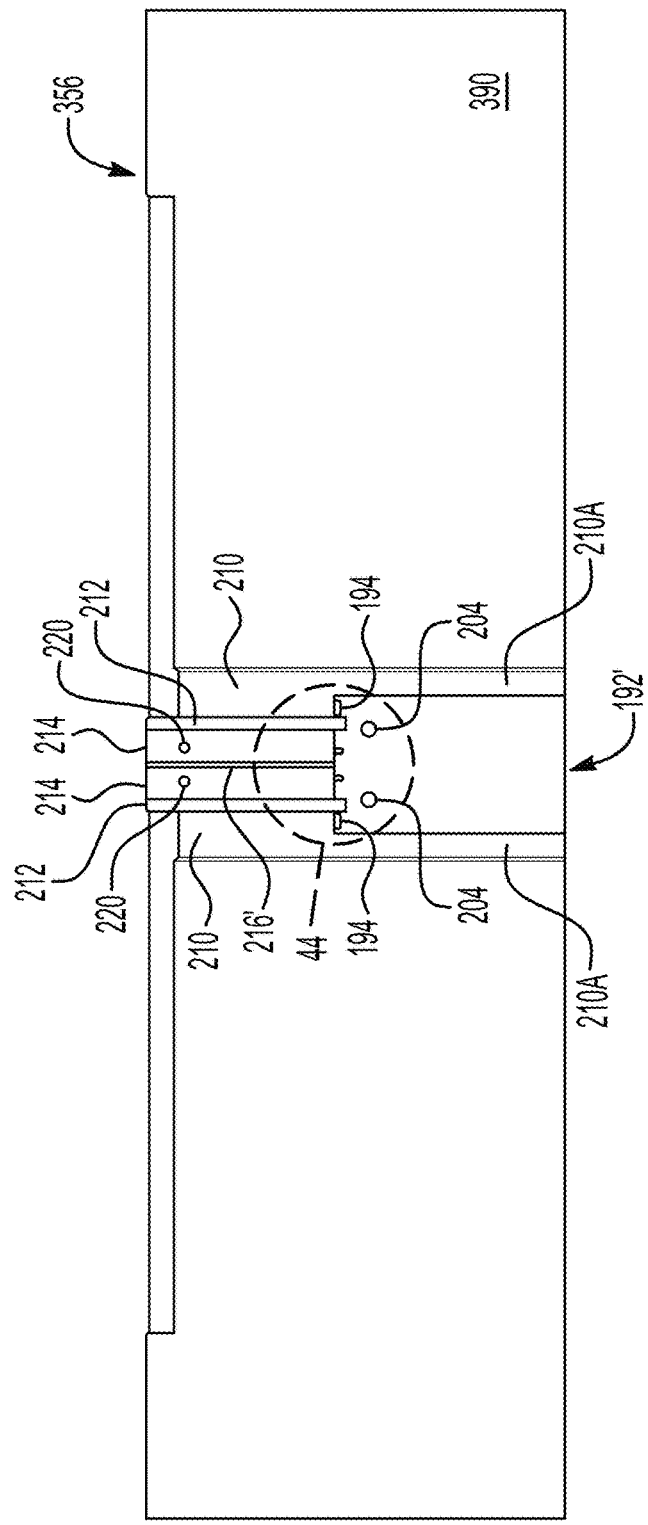
FIG. 42 is a front view of a shoe for use with the casting drum of FIG. 39.
Figure 43:
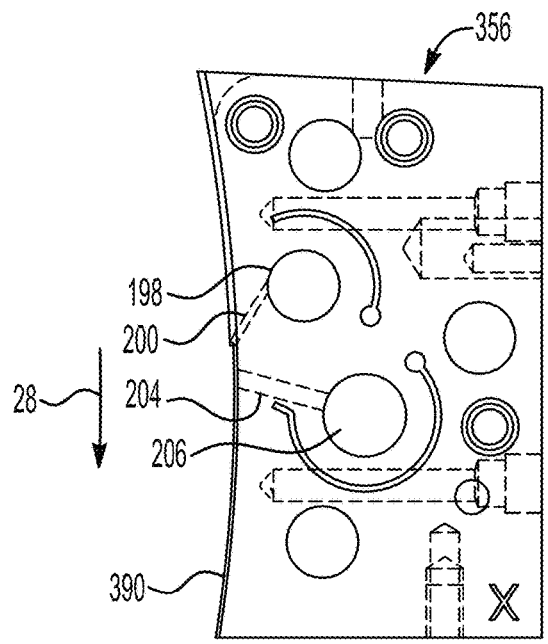
FIG. 43 is an end view of the shoe of FIG. 42.
Figure 44:
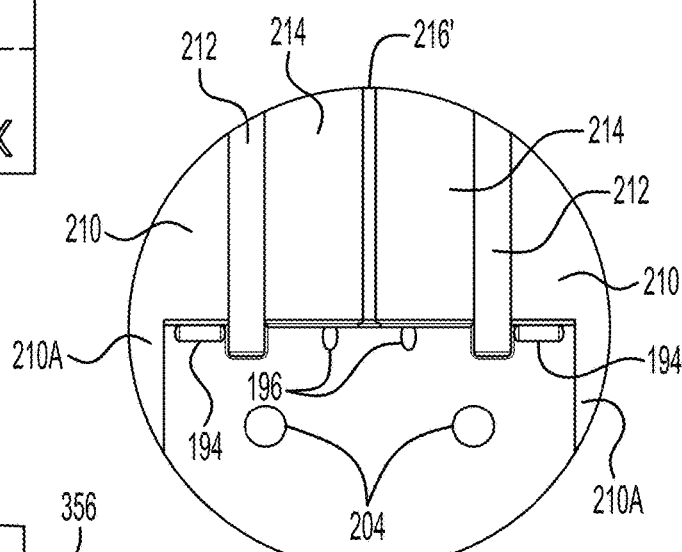
FIG. 44 is an enlarged front view of the mid portion of the shoe in the circle 44 of FIG. 42.
Figure 45:
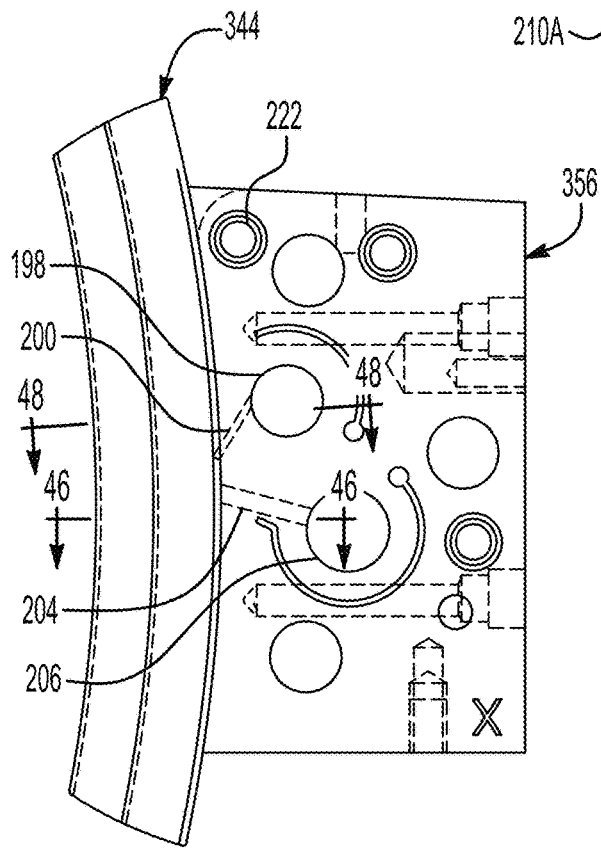
FIG. 45 is an end view of the shoe of FIG. 42 confronting the drum of FIG. 39.
Figure 46:
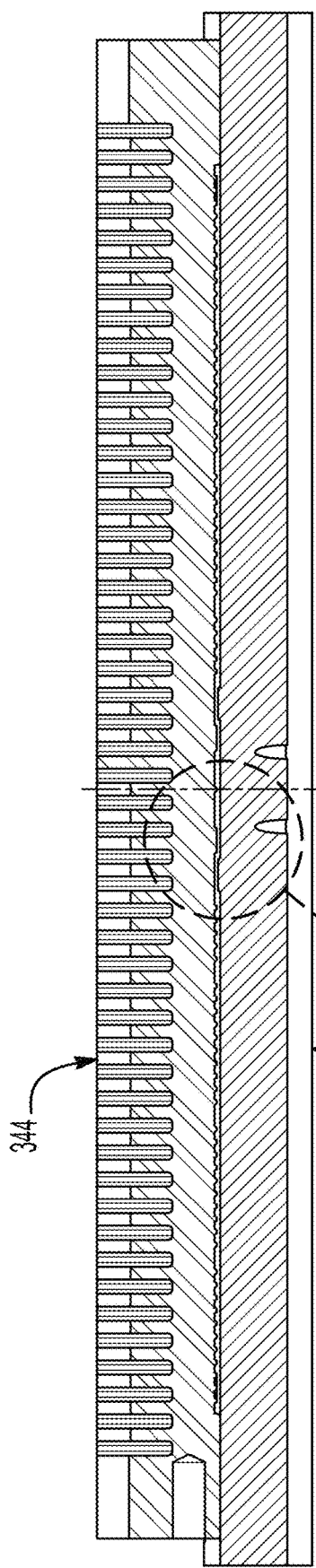
FIG. 46 is an enlarged fragmentary sectional view taken on line 46-46 of FIG. 45.

In operation in the machine 20, liquid lead is supplied to the cavity 346 of the rotating drum 344 through the shoe 356. As shown in FIGS. 42 and 43 the shoe 356 has an arcuate outer face 390 for complimentary mating engagement with a portion of the periphery of the drum 344. The shoe 356 may supply liquid lead to the cavity 346 of the drum through desirably an orifice 192' which may have outlet openings 194 and 196 axially spaced apart from each other. As shown in FIG. 44, the openings 194 may have a generally rectangular configuration and may be elongate and disposed longitudinally generally parallel to the axis of rotation of the drum 344. Desirably in assembly the openings 194 may overlie a portion of the carbon fiber strips 122 axially outward of the lands 185. The openings 196 may be separate bores or circular, axially spaced apart from each other and in assembly with the drum 344 desirably overlie the area between the lands 185 of the drum. As shown in FIG. 43, liquid lead may be supplied under pressure to a bore or passage 198 extending generally axially through the shoe 356 and which may open onto each of the orifice outlet openings 194 through a separate passage 200 for each opening which desirably has a generally rectangular cross-section corresponding to and the same size and cross-sectional shape as the openings 194 (0.03 by 0.18 of an inch). The passage 200 may be inclined at an acute included angle of 50° to 70° and desirably about 60° relative to a radius of the arcuate face 390 extending through the orifice opening 194. Desirably, each of the openings 196 communicates with the lead supply bore 198 through a separate bore 222 which also may be inclined at an acute included angle of about 60 degrees relative to a radius of the arcuate face 390 extending through such opening 196. Each of the passages 200 and 202 extends downwardly toward its associated opening in the face 390 relative to the direction of rotation 28 of the drum 356.

In use, excess liquid lead not entering the cavity 346 is returned through each of desirably at least two bores or circular passages 204 (FIGS. 44 and 42) each opening through the outer face 390 and communicating with a liquid lead return or outlet bore 206 extending axially through the shoe 356. Each return bore 204 opens into the face 390 downstream of the openings 194 and 196 relative to the direction of rotation 28 of the drum 344, may be inclined at an acute included angle of about 10 to 20 and desirably 15 degrees relative to a radius of the arcuate face 390 extending through the opening 204, and extends downwardly away from the opening 204 relative to the direction of rotation of the drum 344. Collectively, the passages 194, 196, and 204 tend to direct liquid lead generally circumferentially into the cavity 346 of the rotating drum 344 and in its direction of rotation to facilitate casting of the lead ribbon 322. Excess liquid lead flowing through the shoe 356 heats it and ensures liquid lead at a desired temperature is supplied to the cavity 346.

In use, to inhibit liquid lead from flowing upstream relative to the direction of rotation 28 of the drum 344, the shoe 356 has as shown in FIGS. 42 and 44, a series of ribs 210, 212, 214, and 216' projecting outward from the face 390 of the shoe 356 and extending generally upward of the orifice 192' relative to the direction of rotation of the drum. In assembly rib 216' overlies the row of lands 184 of the drum. In operation of the machine 20, the extent of axial flow of liquid lead outwardly into the carbon fiber strip 122 may be controlled by compression of a portion of this strip between the circumferential portion 210A of the rib 210 (which portion 210A may extend downstream of the orifice 194 of the shoe) and the drum 344. However, as previously noted the extent of this compression must be limited so that the carbon fiber material is not torn or unduly stressed by movement of the drum 344 relative to the shoe 356. If desired to reduce oxidation of the liquid lead during casting and solidification of the ribbon 322, an inert gas such as nitrogen may be injected into the casting area such as through small passages 220, opening through the ribs 214 upstream of the orifice relative to the direction of rotation of the drum. The passages 220 may communicate with a bore 222 extending axially through the shoe 356 to which an inert gas may be supplied at a flow rate typically in the range of about 10 to 40 standard cubic feet per hour.

In assembly and use, the interface between the drum 344 and the shoe 356 is shown in FIGS. 46-49.

Figure 50:
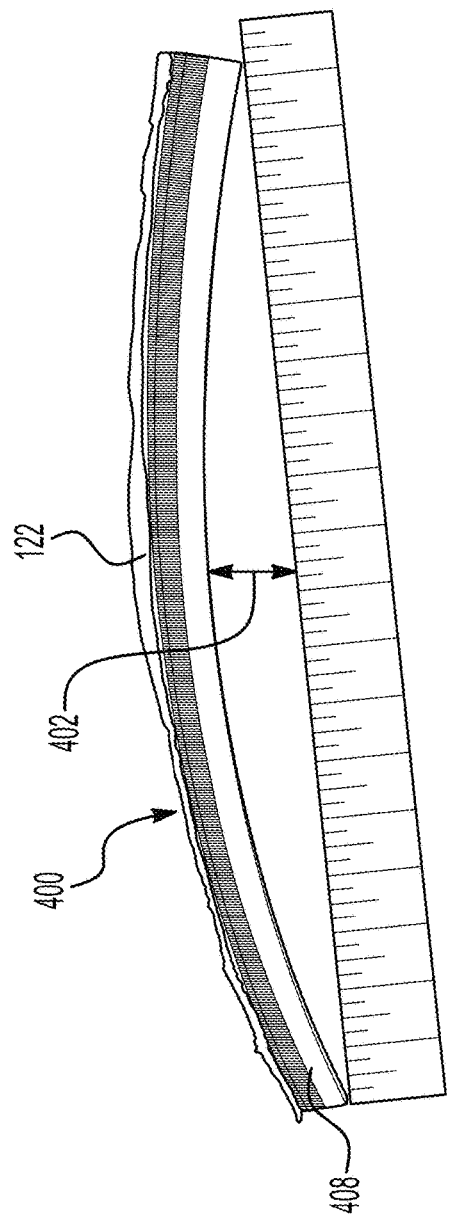
FIG. 50 is a photograph of a portion of an elongate composite strip with a cast lead ribbon without any notches in its outer edge illustrating unacceptable camber of the composite strip.

It has been empirically determined that when casting a longitudinally elongate composite strip with a continuous lead ribbon on a carbon fiber web by a drum rotating relative to a shoe such as the drums 144 and 344 and associated respective shoes 156 and 356, as shown in the photograph of FIG. 50, the resulting composite strip 400 may be bowed or have camber 402 in the plane of the strip 400 to such an extent that it may be unacceptable for mass production of batteries. As shown in FIG. 50, the camber may be 1.75 inches over a 24-inch length of the composite strip, usually in the range of about 0.12 to 2.0 inches over a 24 inch length of the strip and typically may be in the range of 0.12 to 0.75 inches over a 24 inch length of the composite strip 400. This camber is in theory believed to be produced by several factors including, but not limited to, variance in solidification rate of the lead during casting and a difference in the shrinkage rate of the dissimilar lead and carbon fiber materials during cooling. In theory, these causes oftentimes may have a cumulative effect when considering the degree or extent and severity of the camber.

Figure 51:
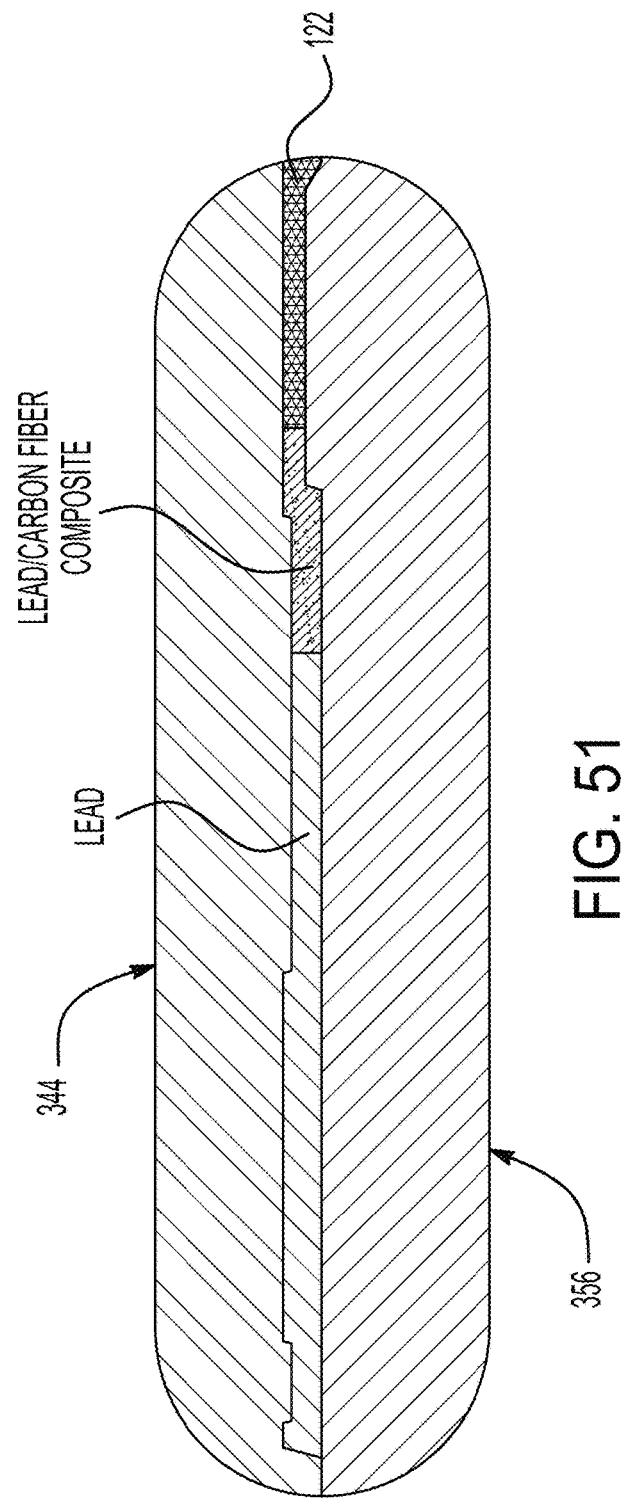
FIG. 51 is a fragmentary sectional view of a casting drum and shoe for making an elongate composite strip.

In theory, during casting, a variance in the lead solidification rate may occur due to both temperature and textural differences in the casting cavity. First, as indicated in FIG. 51, the casting cavity may contain essentially three different temperature zones—two surfaces of the drum may be held at approximately 125-275 degrees Fahrenheit (° F.), one surface of the shoe may be maintained at approximately 475-625 degrees Fahrenheit (° F.), and one surface of the carbon fiber web enters the system at ambient temperature and has a significantly lower coefficient of thermal conductivity compared to the rest of the mold. A steel drum has a thermal conductivity of about 41.5 W/m·K and carbon fiber has a thermal conductivity of about 0.2 W/m·K. This may be necessary because, per an embodiment, the shoe should remain sufficiently hot to deliver molten lead, which has a melting point of about 623 degrees F., to the cavity while maintaining the bulk of the cavity at a low enough temperature to provide rapid solidification of the injected lead or other metal. Second, beyond just temperature, the variance in casting cavity surface texture also may produce different solidification rates across the lead material. The outboard portion of the drum cavity casting the lead ribbon has a smooth texture, the adjacent inboard axially wider portion of the drum cavity has a crosshatch and ribbed texture, the shoe has a smooth confronting surface, and the carbon fiber web is a porous medium. Together, these variances in solidification rates can result in a variance in mechanical stress across the cast lead ribbon, a difference in grain size and alloy segregation, and can even produce sections of extrusion across the newly cast lead material.

Figure 52:
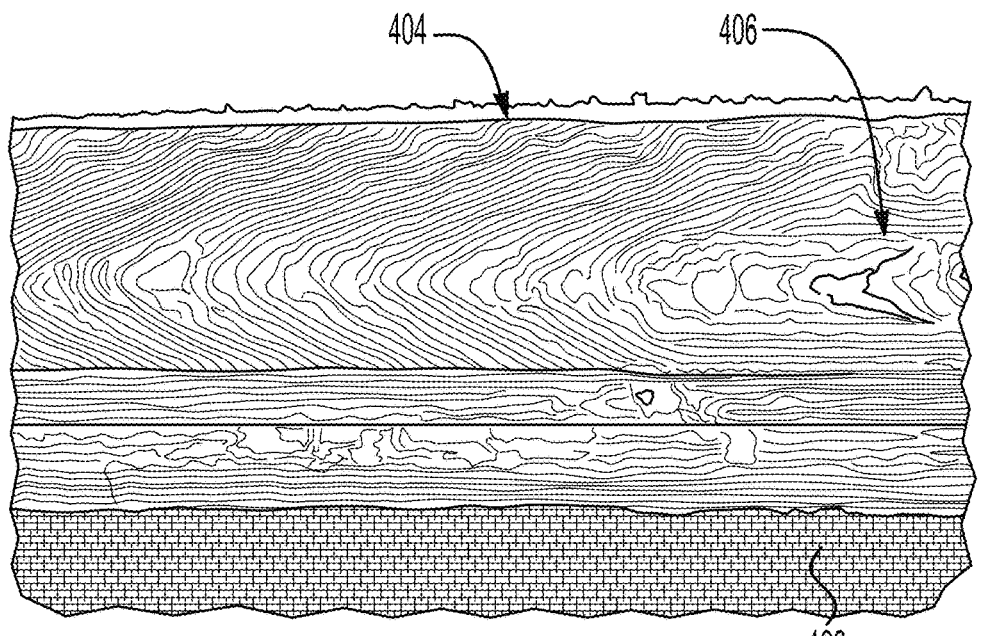
FIG. 52 is a photograph of a portion of another elongate composite strip with a cast lead ribbon without any notches in its outer edge illustrating nonlinear flow lines in the cast ribbon.

In theory, a variable solidification rate across the casting of the lead ribbon may ultimately impact mechanical stress in the cast and cooled lead ribbon. Mechanical stress is oftentimes induced via sliding friction between the cast ribbon and the shoe surface. Because the drum portion of the casting cavity has a texture, and the drum itself is rotated relative to a fixed shoe, the drum is considered to be the driving surface in the continuous casting process. Therefore, it is necessary that the cast lead slide along the smooth shoe surface to continuously exit the mold cavity as a solidified or solid ribbon. Because the drum side of the cavity is significantly colder than the shoe side of the cavity, the drum side of the cast ribbon can solidify or freeze before the shoe side and therefore its shoe side can move through the mold at a different speed. Of course, the portion of the cast ribbon frozen and solidified to the drum will move at the speed of the drum, but a later-to-freeze slushy zone on the shoe side may move at a slightly slower speed due to friction against the shoe. This process causes residual stress between the drum side and the shoe side of the solidified cast lead ribbon. The mechanical stress induced by variable solidification rates is not only present in the drum side versus shoe side, but it is also present in the lateral edges of the solidified and cooled lead ribbon. Because molten lead is distributed to the cavity generally in the center portion of the mold, both the outboard edge of the drum cavity and the inboard edge of its porous carbon fiber zone receive comparatively lower temperature lead than the center portion of the cast ribbon, thus complete solidification may oftentimes take place earlier on the edges. This can result in residual stress between the outboard edges of the lead material compared to its center portion. As shown in the photograph of FIG. 52, this may result in non-linear flow lines 404 and even tearing 406 evident on the shoe side of cast lead ribbon due to sliding friction.

Figure 53:
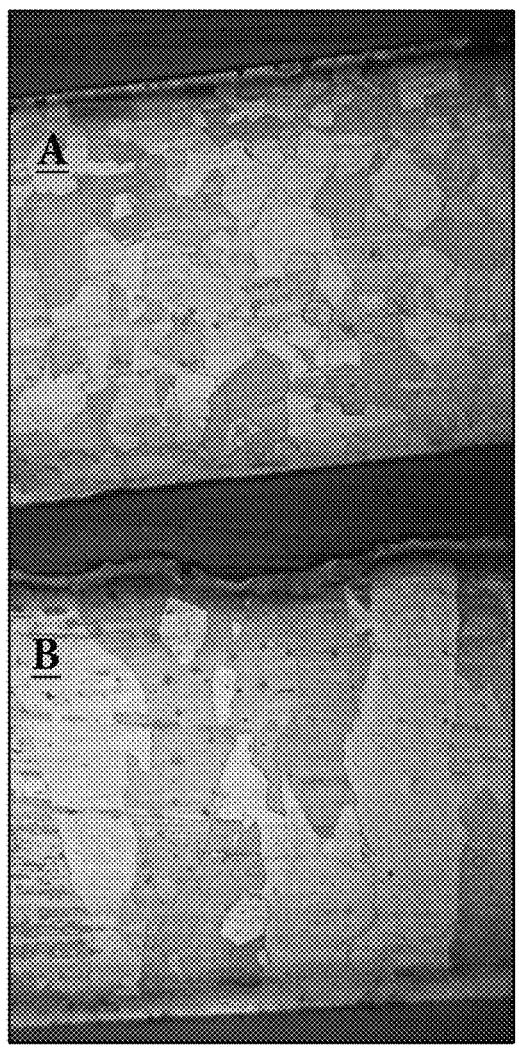
FIG. 53 is a photograph of two cross sections of cast lead ribbon without notches of a composite strip magnified 50X times illustrating grain size in the cast ribbon.

As shown in the two cross-sections magnified 50X times of a cast lead ribbon of a composite strip of FIG. 53, variable solidification rates also can impact grain size and alloy segregation in the lead ribbon. Faster solidification rates yield a smaller grain size (top of image, denoted A) compared to slower solidification rates (bottom of image, denoted B). Non-uniformity of grain size, in turn, results in non-uniformity of the physical properties of the cast lead ribbon. Grain size is one of several key factors that determine stiffness and ultimate tensile strength of the cast ribbon. Variability in these physical characteristics can lead to warping and bowing or camber during cooling, crystallization, and post manufacturing processing and handling of the composite strip.

Along with temperature effects, differences in shrinkage rates across the elongate composite strip may significantly impact camber. The leading cause of shrinkage variances in this system arise from the joining of two dissimilar materials, lead and carbon fiber. First, the two materials have a vastly different coefficient of thermal expansion. The coefficients of thermal expansion of lead is about $29 \times 10^{-6}$ m/m° C. and of carbon fiber is about $6 \times 10^{-6}$ m/m° C. These values indicate the lead metal will shrink significantly more than the carbon fiber upon cooling to room temperature. Since only one continuous edge of the cast ribbon is solid lead, with the other being a mixture of carbon fiber impregnated with lead, it should be expected that the two edges will experience various degrees of shrinkage upon cooling—with the solid lead edge shrinking comparatively more. Second, it has been found that the carbon fiber can perform similarly to structural rebar when impregnated with lead. The carbon fibers form a network through the lead metal that significantly reduces ductility and adds considerable stiffness to the material. The structural impact is one that ultimately reduces shrinkage in this network during cooling of the lead, thus causing a further disparity in final length between the outboard and inboard edges of the lead ribbon.

Figure 54:
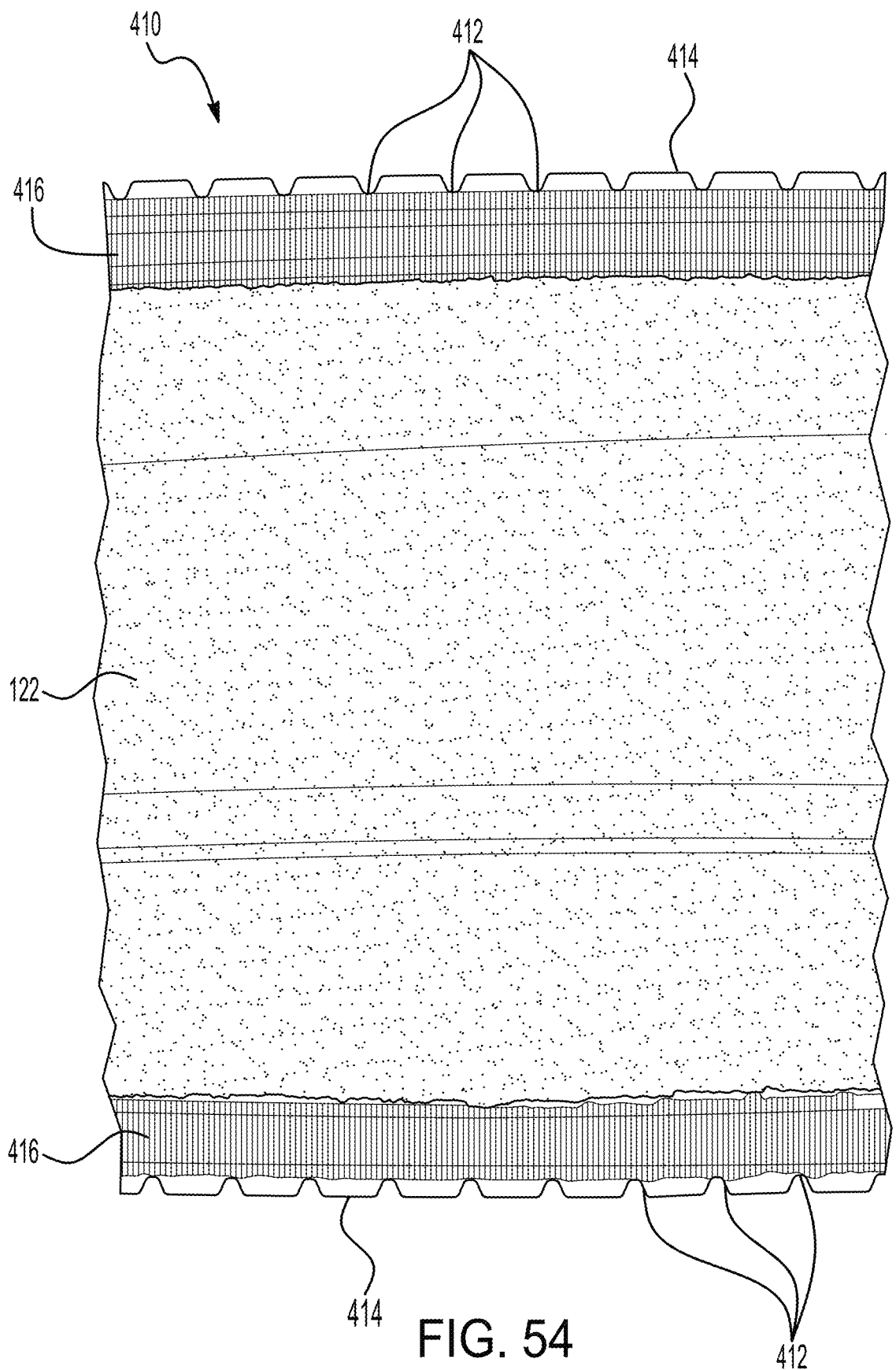
FIG. 54 is a fragmentary plan view of a longitudinally elongate composite strip with a cast lead ribbon with notches and attached to an edge of a web of carbon fiber material.

As shown in FIG. 54, one successful way of reducing camber to an acceptable level in an elongate composite strip 410 is to provide a series of generally longitudinally spaced apart discontinuities such as spaces, gaps, slots or notches (hereinafter collectively referred to as notches) 412 of some geometry along and opening through an outboard edge 414 of the lead ribbon 416 as it is being cast in a mold. The notches 412 can exhibit a generally U- or V-shape. Forming these notches 412 while casting provides several benefits including, but not limited to, the fact that it helps drive the lead material as one continuous unit during solidification, reduces the overall volume of molten lead material that needs to solidify, provides shorter linear segments along the outer edge of the lead ribbon that generally experiences excessive shrinkage, substantially prevents linear shrinkage, and reduces grain structure differences by reducing overall cast axial or transverse width of the lead ribbon.

Figure 58:
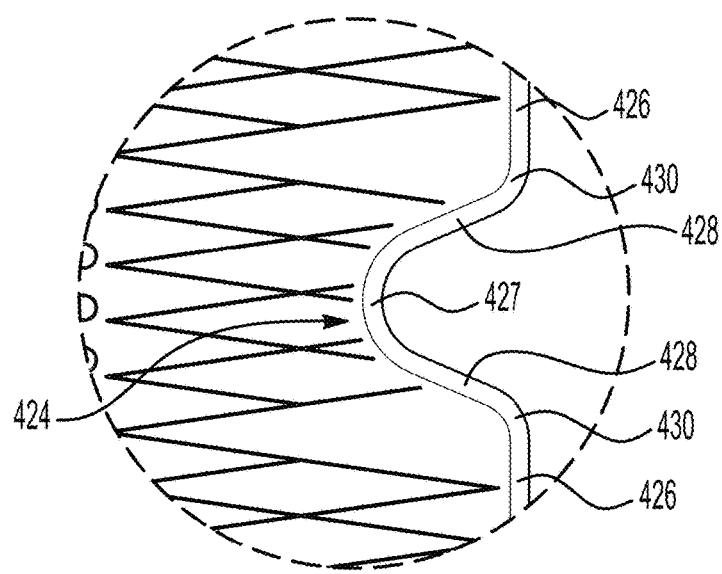
FIG. 58 is an enlarged view of the portion in circle 57 of FIG. 56.

A portion of a suitable mold cavity 420 in a drum 422 for a continuous casting machine (such as machine 20) is shown in FIG. 55 in which generally axially inward extending protrusions 424 in the outboard cavity wall 426 form the notches 412 in the cast lead ribbons 416 of the elongate composite strip 410. As shown by FIGS. 55-57, the cavity for casting each lead ribbon may include portions forming drive ribs or lands 185 and knurls on each side of the drive ribs or lands. As shown in FIG. 58 each protrusion 424 may have a rounded nose portion 427 merging into side portions 428 each inclined at an acute included angle of about 20-30 degrees to an axis of rotation of the drum and merging with a radius 430 into the cavity wall 426 of the mold cavity. This cavity 420 and drum 422 may be substantially the same as the drum 144 or 344 and its cavity 150 or 346 respectively except for the addition of the protrusions 424 to form the notches 412 in the cast lead ribbon.

The longitudinal or circumferential distance 432 between the tips of the noses of adjacent protrusions should not exceed the distance between the first and second outlet openings 433, 435 of the lead feed orifices and the upstream top of a casting shoe complementary with the drum 422 such as the shoe 434 shown in FIG. 60. Essentially, the circumferential extent of the cavity between adjacent protrusions 424 must not be open to both the casting zone (where lead is delivered) and the exterior of the shoe at any given time. If it were open, then the pressurized molten lead would "up-flow" relative to the direction of rotation of the drum 422 and could potentially exit the shoe 434 under pressure. This longitudinal or circumferential distance between the tips of adjacent protrusions 424 is among other things dependent on the circumferential distance between the first and second outlet openings 433, 435 and the upstream top of the shoe 436 and may typically be in the range of about 0.25 to 1.0 inch.

Figure 59:
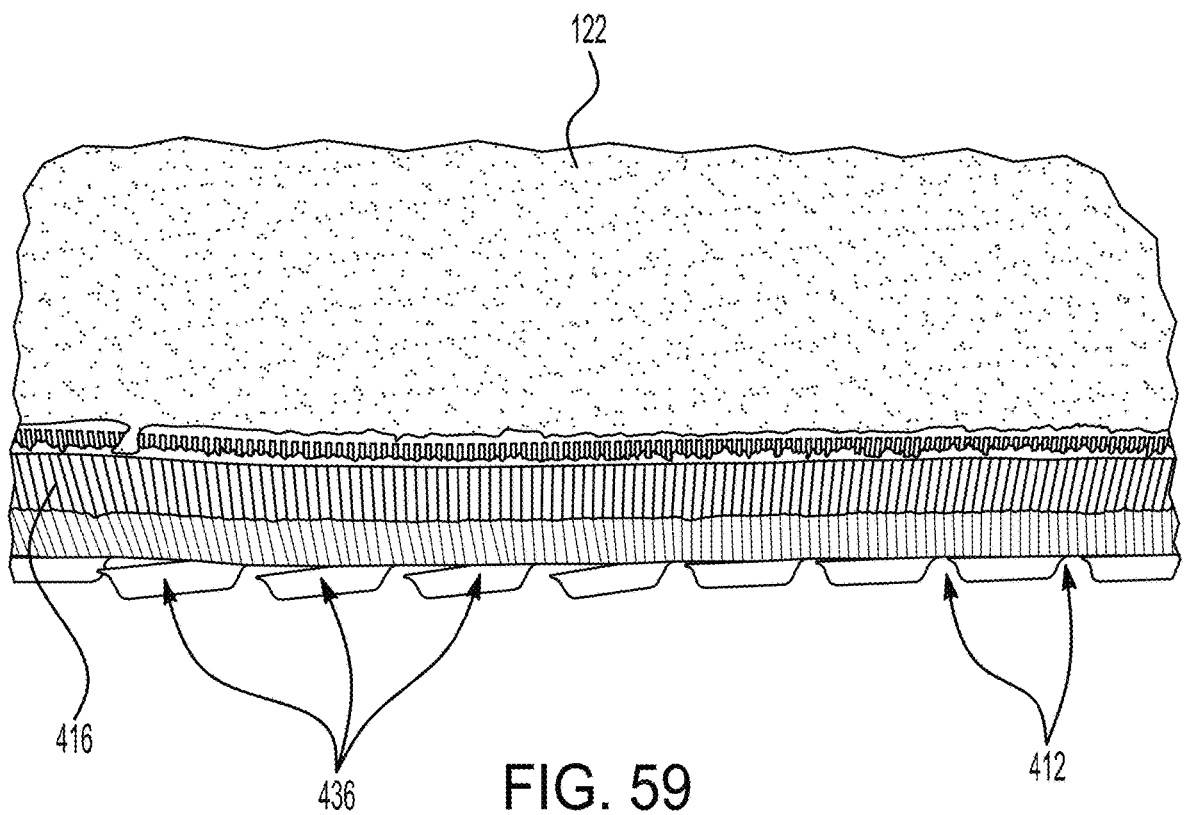
FIG. 59 is a photograph of a portion of an elongate composite strip with a cast lead ribbon with notches illustrating a failure in casting the area between adjacent notches.

As the longitudinal distance 432 is increased between the tips of the noses 427 of adjacent protrusions 424 toward or to a maximum based on the above limitations, it becomes possible that a "notch-knit" defect 436 shown in FIG. 59 may be introduced into the casting. The casting of the notches 412, regardless of dimensions, provides a longitudinal section of the mold cavity that opens to the casting zone where molten lead can up-flow into the cavity. Then, as the drum rotates downstream, the up-flow lead is often sufficiently cooled so that downstream incoming molten lead cannot knit to or become integrated as an integral part of the trailing cooled lead material. This problem is further exacerbated by low rotary speeds of the drum 422 because this increases the amount of time that the up-flow lead can cool and solidify before coming back down into the casting zone of the drum cavity 420. Therefore, decreased longitudinal spacing 432 between adjacent cavity axial protrusions 424 and thus the cast notches 412 of the lead ribbon 416 and increased rotary speeds of the drum 422 are desirable to prevent knit problems.

To further combat knit problems, as shown in FIG. 60, it is desirable to locate the second outlet opening 435 of the lead feed orifice in the shoe 434 so that it bridges transversely across the longitudinal area of the mold cavity 420 between adjacent protrusions 424. By bridging this notch-knit area it becomes filled with high pressure molten lead that brings excess heat and turbulence into this area thus supporting improved knitting or integration with molten lead in the adjacent portion of the cavity casting the lead ribbon.

If after casting an elongate composite strip 410 with notches 412, it is desired or necessary to further decrease any remaining camber, as shown in FIG. 61, it may be passed through an assembly 440 of straightening rollers which may consist of three rollers 442, 444, and 446 of this assembly or multiple sets of three rollers in an assembly. In the three roller assembly of FIG. 61, all three rollers may be cylinders of the same diameter disposed with essentially parallel axes of rotation and either all rotated at the same surface speed to put succeeding portions of the composite strip 410 in tension to thereby decrease its camber or the middle roller 444 and downstream roller 446 may be rotated at a slightly higher surface speed than that of the first roller 442 to stretch and permanently slightly elongate the cast lead ribbon of the composite strip to decrease any remaining camber. Persons skilled in the art of camber reduction are familiar with various other straightening roller assemblies and their construction and operation.

Figure 62:
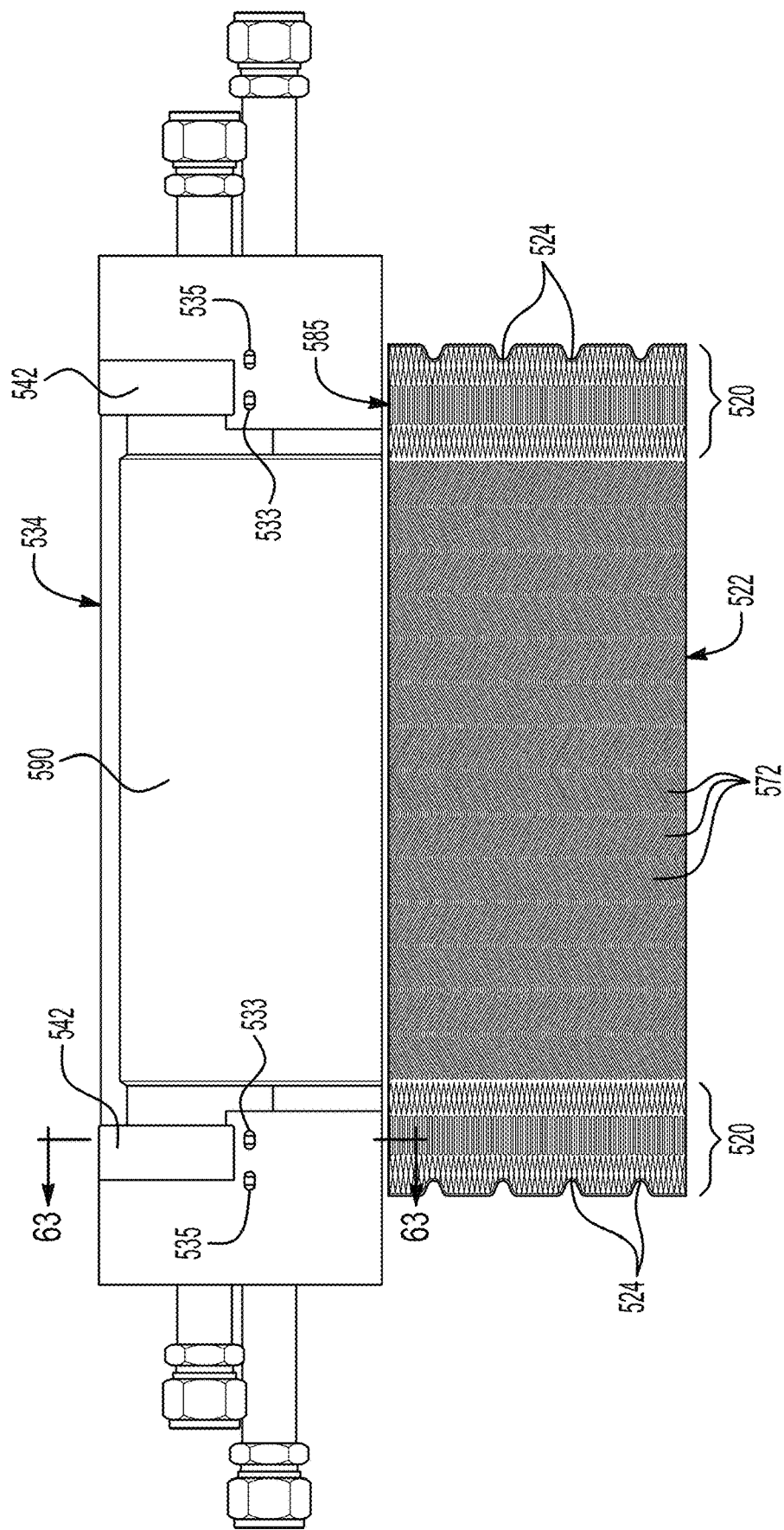
FIG. 62 is a schematic view of an embodiment of a drum and an embodiment of a shoe.
Figure 63:
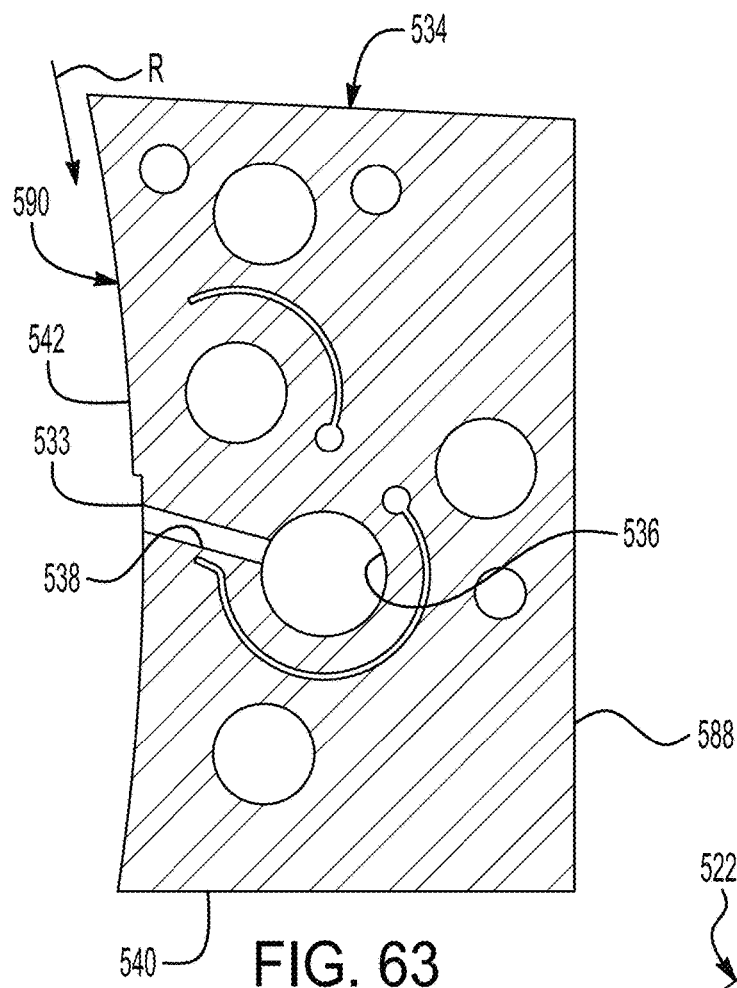
FIG. 63 is a sectional view of the shoe of FIG. 62 taken at line 63-63 in FIG. 62.

With reference to FIGS. 62 and 63, embodiments of a drum 522 and a shoe 534 are presented. The drum 522 possesses similarities with drums of previous embodiments, particularly the drum 422 of FIG. 60, and some of these similarities may not be repeated here. The drum 522 has a pair of mold cavities 520 with protrusions 524 that extend generally axially inwardly. The protrusions 524 may be the same as protrusions 424 previously described with reference to FIGS. 55-58. Further, lands 572 and 585 may be provided, as described elsewhere with reference to previous embodiments.

The shoe 534 may differ from shoes described with previous embodiments, and may be similar to the shoe 434 of FIG. 60. The shoe 534 has an arcuate outer face 590 for complementary mating engagement with a portion of a periphery of the drum 522. The shoe 534 supplies liquid lead to the mold cavities 520 of the drum 522 via first and second outlet openings 533, 535 that are open to, and communicate with, the outer face 590 at their respective locales. The first and second outlet openings 533, 535 reside as a pair on each axial side of the shoe 534, as shown by FIG. 62. The first and second outlet openings 533, 535 are spaced longitudinally and axially apart from each other. A generally oval cross-sectional profile is provided for the first and second outlet openings 533, 535 according to this embodiment, but others shapes and sizes could be provided in other embodiments. In one example, the cross-sectional profiles have a height dimension of about 0.125 inches; still, other dimensional values can be provided in other examples. The first outlet openings 533 axially and radially align with the approximate corresponding coordinates of the lands 585, and hence the first outlet openings 533 overlie with the lands 585. The second outlet openings 535, on the other hand, can axially and radially align with the approximate corresponding coordinates of the protrusions 524 so that the second outlet openings 535 bridge transversely across the longitudinal area of the mold cavities 520 between adjacent protrusions 524, as previously set forth, for an improved knitting result.

Figure 65:
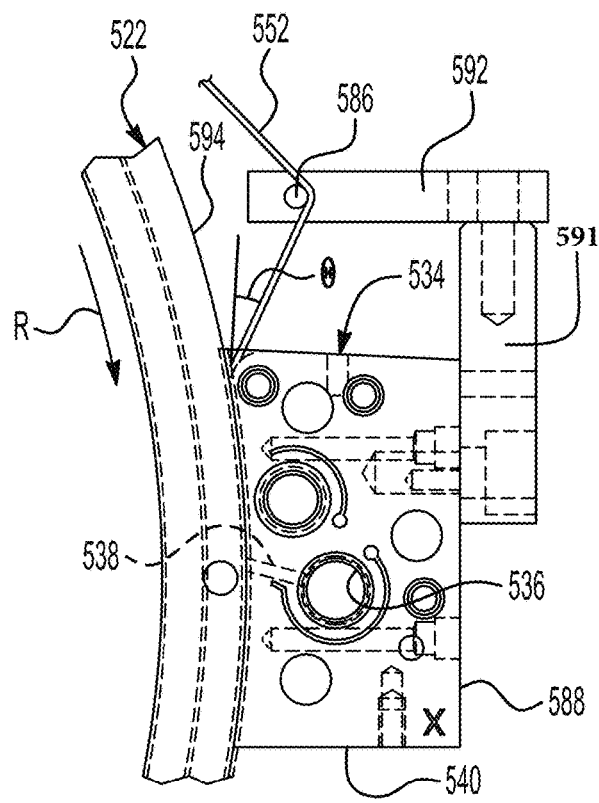
FIG. 65 is an enlarged view of an embodiment of a shoe that can be equipped in the carbon fiber material feed assembly of FIG. 64, the enlarged view taken at circle 65 in FIG. 64.

Unlike previous embodiments, the shoe 534 has a single liquid lead supply bore and passage, with an outlet and return function but lacks a separate liquid lead outlet and return with accompanying passages and tubes of the previous embodiments. It has been determined that the single liquid lead supply bore and passage introduces an effective and efficient amount of liquid lead to the mold cavities 520. The liquid lead supply bore and passage without the separate outlet and return constitutes a simpler configuration compared to previous embodiments, facilitating the use of a single pump like the molten lead pump 42 of FIG. 2. Referring to FIGS. 62 and 63, the shoe 534 has a molten metal supply bore 536, or liquid lead supply bore, and has a molten metal supply passage 538, or liquid lead supply passage. While the sectional view of FIG. 63 is taken at one of the first outlet openings 533, a similar liquid lead supply bore and passage 536, 538 are provided at both of the first outlet openings 533 and at both of the second outlet openings 535. In this embodiment, and as will become apparent via a comparison between FIGS. 26 and 65, for instance, the liquid lead supply bore and passage 536, 538 of the shoe 534 are the excess and return bore and passage 206, 204 of the previous shoe 156. That is, the liquid lead supply bore and passage 536, 538 can possess a similar design, construction, and arrangement to excess and return bores and passages of previous embodiments. Moreover, the shoe 534 altogether lacks the functioning furnished by separate liquid lead excess and return bores and passages of previous embodiments. As shown in FIGS. 63 and 65, the passage 538 is angled upwardly in opposition to a direction of rotation R of the drum 522. In an example, the upward angle may measure about fifteen degrees (15°) with respect to a bottomside 540 of the shoe 534; still, other angle measurements are possible in other embodiments. Lastly, in order to inhibit liquid lead from flowing upstream relative to the direction of rotation R, ribs 542 are provided. The ribs 542 project outwardly from the outer face 590 and extend upward of the first and second outlet openings 533, 535. As illustrated in FIG. 62, the ribs 542 have an axial position and location in-line with those of the first outlet openings 533, and in-line with about one-half of the second outlet openings 535.

Figure 64:
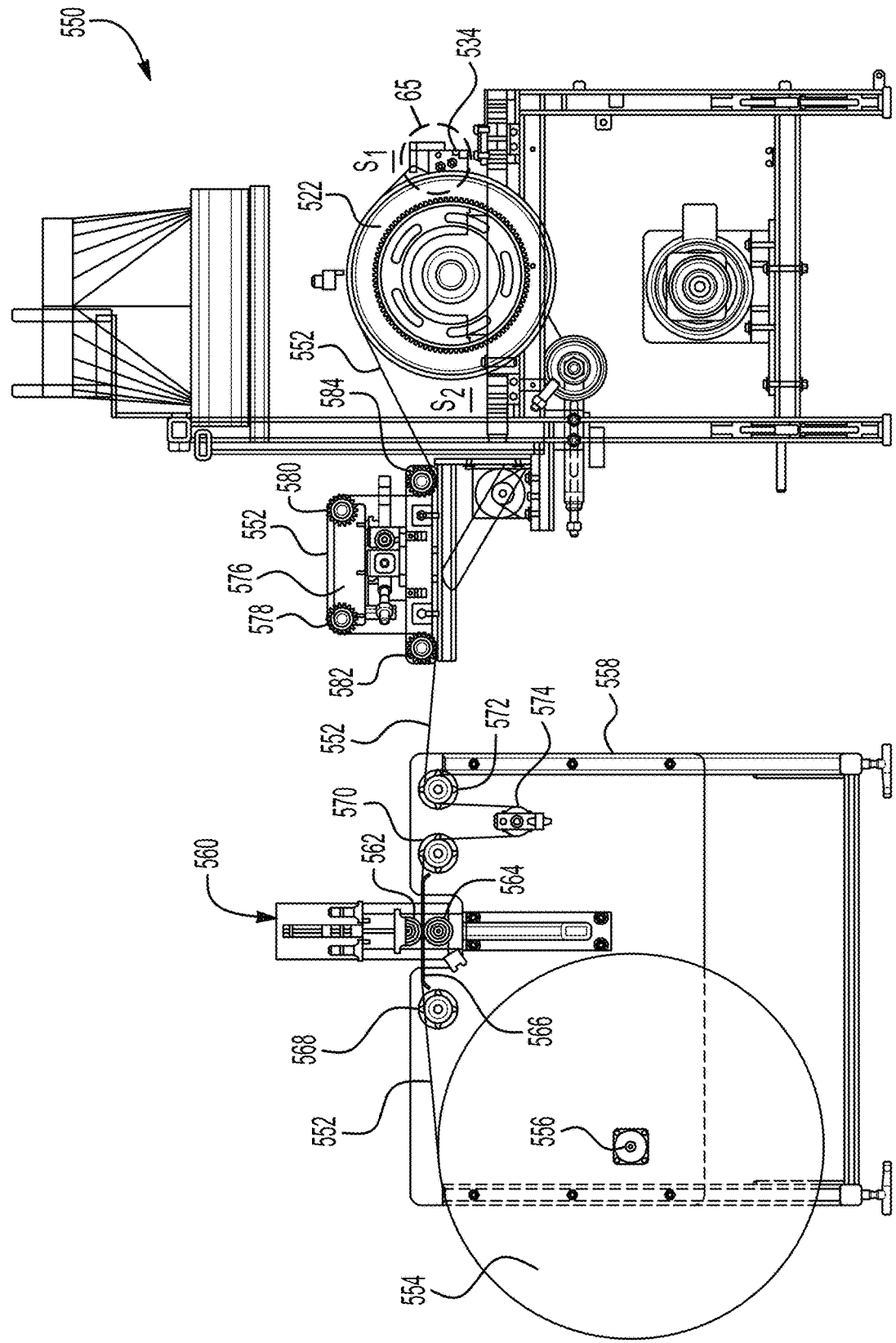
FIG. 64 is a schematic view of an embodiment of a carbon fiber material feed assembly.
Figure 66:
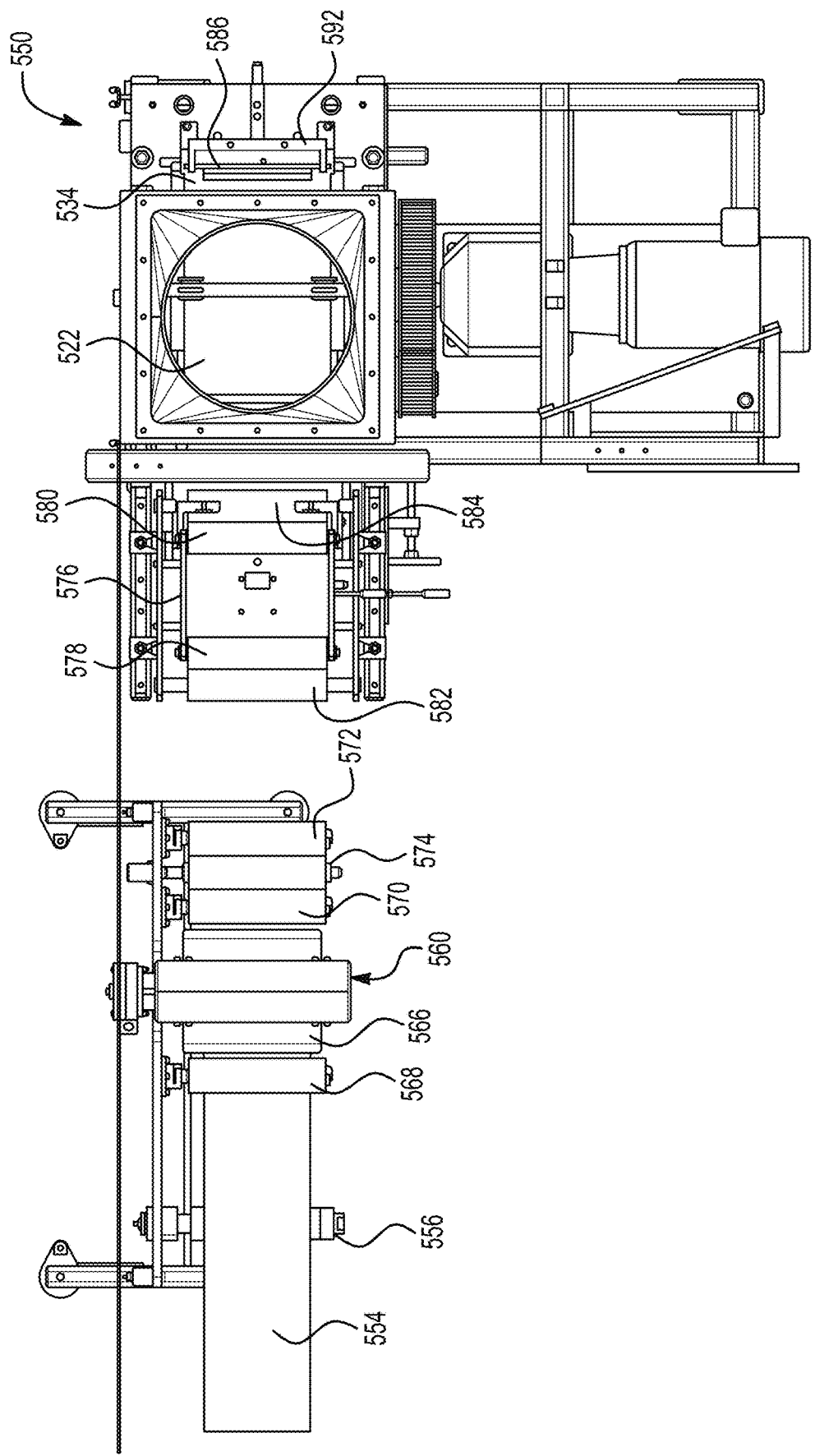
FIG. 66 is a top view of the carbon fiber material feed assembly of FIG. 64.

An embodiment of a carbon fiber material feed assembly 550 is presented in FIGS. 64-66. The carbon fiber material feed assembly 550 is an assembly of components that work together to uncoil, steer, and provide tension to an electrically conductive carbon fiber material 552, or carbon felt, and to feed and introduce the carbon fiber material 552 for entry between the drum 522 and shoe 534. The carbon fiber material feed assembly 550 can have various designs, constructions, and components in different embodiments depending upon—among other possible factors—the particular carbon fiber material being fed for processing and the particular drum and shoe being implemented in the larger system.

In the embodiment of FIGS. 64-66, a roll of supplied carbon fiber material 554 is carried by a free spinning air shaft 556 at one end of the carbon fiber material feed assembly 550. The roll of supplied carbon fiber material 554 is unwound amid use and activation of the carbon fiber material feed assembly 550. A frame 558 provides structural support for the air shaft 556, as well as for downstream components and assemblies. Downstream of the roll of supplied carbon fiber material 554, a tensioner assembly 560 serves to impart tension control in the carbon fiber material 552 as it is being unwound and elsewise. The tensioner assembly 560 can also exert a pulling force on the roll of supplied carbon fiber material 554. In the embodiment here, the tensioner assembly 560 is of the type of a nip roll assembly with a magnetic particle clutch. Upper and lower rollers 562, 564 are provided, as well as a guide band 566. A first roller 568 resides upstream of the tensioner assembly 560, a second roller 570 resides downstream of the tensioner assembly 560, and a third roller 572 resides yet farther downstream. The first, second, and third rollers 568, 570, 572 can be idler rollers. Furthermore, a load cell 574 is equipped between the second and third rollers 570, 572. The load cell 574 senses the tension in the carbon fiber material 552, and communicates an indicative electrical output signal to the tensioner assembly 560 for closed-loop tension control. In one example, approximately one to three pounds (1-3 lbs.) of pressure is exerted and maintained on the carbon fiber material 552 as it is being fed; still, other pressures can be exerted in other examples. Yet farther downstream, but still upstream of the drum 522 and shoe 534, a web pivot guide 576 is equipped in order to steer and/or guide the carbon fiber material 552 as it courses over the web pivot guide 576 and prior to entry between the drum 522 and shoe 534. The web pivot guide 576 includes a first guide roller 578 and a second guide roller 580, as well as a third guide roller 582 and a fourth guide roller 584.

As can be observed from FIGS. 64 and 66, main components of the carbon fiber material feed assembly 550 are located at a backside of the drum 522, and on an opposite side compared to the shoe's interaction with the drum 522. The carbon fiber material 552 is hence fed from the backside of the drum 522 and behind the drum 522 for entry between the drum 522 and shoe 534, and is fed upwardly and over the drum 522 on its course—this rear and upward feeding is evident from FIG. 64. The shoe 534 is located at a first side $S_1$ of the drum 522, while the carbon fiber material 522 is fed from a second side $S_2$ of the drum 522. This feeding direction and arrangement, according to this embodiment, has been found to effectively and efficiently feed and introduce the carbon fiber material 552 for entry between the drum 522 and shoe 534. To further facilitate and ensure proper entry as the carbon fiber material 552 nears the drum 522 and shoe 534 interfacial region, a guide bar 586 is provided. With particular reference now to FIG. 65, the guide bar 586 extends from the shoe's body, and is mounted to a backside 588 of the shoe 534. A first arm 591 is bolted to the backside 588, and a second arm 592 is bolted to the first arm 591 and depends therefrom. The guide bar 586 is suspended vertically above the shoe 534 and radially outboard of the drum 522 via the first and second arms 591, 592. The guide bar 586 is in the form of a cylindrical rod in this embodiment. The guide bar 586 redirects and supports and holds the carbon fiber material 552 off of an outer face 594 of the drum 522. The carbon fiber material 552 passes over the guide bar 586. The carbon fiber material 522 is brought away from the drum's outer face 594 via the guide bar 586 on its course over the drum 522 where the carbon fiber material 552 otherwise makes surface-to-surface abutment with the outer face 594 at a topside of the drum 522 (see FIG. 64). By way of the guide bar 586, the incoming carbon fiber material 552 enters the drum 522 and shoe 534 at an acute angle θ with respect to the shoe's backside 588 (i.e., with respect to a vertical direction per the orientation presented in FIG. 65). In an example, the acute angle θ measures approximately twenty-five degrees (25°); still, other angles can be provided in other examples. Yet still, in other embodiments, the carbon fiber material feed assembly 550 could have more, less, and/or different components than those shown and described herein.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for continuous casting a composite strip of an electrically conductive metal attached along at least one edge of an elongate web of carbon fiber material, the system comprising:
    a mold comprising a drum rotatable about an axis of rotation;
    a circumferentially continuous portion of the drum configured to receive on part thereof a portion of the web of carbon fiber material for movement with the drum;
    at least one mold cavity extending circumferentially around the drum and configured in part to underlie an adjacent edge of the portion of the web of carbon fiber material received on the drum and extending transversely outward of the adjacent edge of the portion of the web of carbon fiber material;
    the at least one mold cavity configured to cast an elongate ribbon of electrically conductive metal attached to the adjacent edge of the portion of the web of carbon fiber material received on the drum and extending transversely outward thereof with an outer edge of the elongate ribbon of electrically conductive metal having a plurality of longitudinally spaced apart notches therethrough and opening to the outer edge of the elongate ribbon of electrically conductive metal;
    a casting shoe in confrontation with the drum of the mold at a first side of the drum, the casting shoe having a guide bar for supporting a portion of the web of carbon fiber material prior to receipt of the portion of the web of carbon fiber material between the casting shoe and the drum; and
    a carbon fiber material feed assembly situated at a second side of the drum and opposite of the first side of the drum, the carbon fiber material feed assembly feeding the web of carbon fiber material to the casting shoe and drum, the carbon fiber material feed assembly including a plurality of rollers, and the carbon fiber material feed assembly feeding the web of carbon fiber material from the second side of the drum that is opposite the first side of the drum.

2. The system of claim 1 wherein the drum also comprises a plurality of lands circumferentially spaced around the drum and configured to underlie and bear on a portion of the web of carbon fiber material received on the drum.

3. The system of claim 2 wherein the lands are in a zig zag pattern.

4. The system of claim 2 wherein the at least one mold cavity also comprises a plurality of circumferentially spaced apart lands therein for casting a plurality of spaced apart ribs of the elongate ribbon of electrically conductive metal.

5. The system of claim 4 wherein the plurality of circumferentially spaced apart lands in the at least one mold cavity are spaced from the adjacent edge of the portion of the web of carbon fiber material.

6. The system of claim 4 wherein the at least one mold cavity has a circumferentially continuous wall spaced from the portion of the web of carbon fiber material received on the drum and having a plurality of circumferentially spaced apart protrusions extending into the at least one mold cavity and configured to form at least in part the notches cast in the elongate ribbon of electrically conductive metal.

7. The system of claim 1 wherein the at least one mold cavity also comprises a plurality of circumferentially spaced apart lands therein for casting a plurality of spaced apart ribs of the elongate ribbon of electrically conductive metal.

8. The system of claim 7 wherein the plurality of circumferentially spaced apart lands in the at least one mold cavity are spaced from the adjacent edge of the portion of the web of carbon fiber material.

9. The system of claim 7 wherein the at least one mold cavity has a circumferentially continuous wall spaced from the portion of the web of carbon fiber material received on the drum and having a plurality of circumferentially spaced apart protrusions extending into the at least one mold cavity and configured to form at least in part the notches cast in the elongate ribbon of electrically conductive metal.

10. The system of claim 1 wherein the at least one mold cavity has a circumferentially continuous wall spaced from the portion of the web of carbon fiber material received on the drum and having a plurality of circumferentially spaced apart protrusions extending into the at least one mold cavity and configured to form at least in part the notches cast in the elongate ribbon of electrically conductive metal.

11. The system of claim 1 wherein the drum also comprises a plurality of lands circumferentially spaced around the drum and configured to underlie and bear on a portion of the web of carbon fiber material received on the drum and in cooperation with a casting shoe confronting the portion of the web of carbon fiber material compressing at least a part of the portion of the web of carbon fiber material.

12. The system of claim 11 wherein a thickness of the at least part of the portion of the web of carbon fiber material is compressed at least 30 percent relative to an uncompressed thickness of the at least part of the portion of the web of carbon fiber material.

13. The system of claim 1, the casting shoe comprising:
    a body having a face configured to confront the drum and extending axially over at least an axial extent of the at least one mold cavity and the part of the drum configured to receive the portion of the web of carbon fiber material on the drum; and
    at least one orifice with an opening into the face of the body, wherein the opening bridges at least the part of the at least one mold cavity configured to cast the notches in the ribbon of electrically conductive metal.

14. The mold of claim 13, wherein the guide bar extending from the body of the casting shoe, the guide bar supporting the portion of the web of carbon fiber material prior to receipt of the portion of the web of carbon fiber material between the body and the drum, the guide bar supporting the portion of the web of carbon fiber material at a radially outboard distance away from the drum.

* * * * *